(12) United States Patent
Aldrich

(10) Patent No.: US 7,974,823 B1
(45) Date of Patent: Jul. 5, 2011

(54) TEST POSTCONDITION ITEMS FOR AUTOMATED ANALYSIS AND TEST GENERATION

(75) Inventor: William J. Aldrich, Natick, MA (US)

(73) Assignee: The Mathworks, Inc., Natick, MA (US)

( * ) Notice: Subject to any disclaimer, the term of this patent is extended or adjusted under 35 U.S.C. 154(b) by 0 days.

(21) Appl. No.: 12/762,146

(22) Filed: Apr. 16, 2010

Related U.S. Application Data

(63) Continuation of application No. 11/842,135, filed on Aug. 21, 2007, now Pat. No. 7,734,455, which is a continuation of application No. 11/433,611, filed on May 12, 2006, now Pat. No. 7,729,894.

(51) Int. Cl.
    *G06F 9/455* (2006.01)
(52) U.S. Cl. .......................... 703/7; 716/106
(58) Field of Classification Search .................. 703/6, 7, 703/11, 17; 714/741, 38; 716/1, 106; 702/19; 705/1, 7; 709/218; 725/2, 86; 434/322
See application file for complete search history.

(56) References Cited

U.S. PATENT DOCUMENTS

| | | | | |
|---|---|---|---|---|
| 6,058,253 | A * | 5/2000 | Lowe .............................. | 716/106 |
| 7,680,632 | B1 | 3/2010 | Aldrich | |
| 2002/0128809 | A1 * | 9/2002 | Roesner et al. .................. | 703/17 |
| 2004/0133914 | A1 * | 7/2004 | Smith et al. ..................... | 725/86 |
| 2004/0181441 | A1 * | 9/2004 | Fung et al. ........................ | 705/7 |
| 2005/0187745 | A1 * | 8/2005 | Lurie et al. ...................... | 703/11 |
| 2005/0187746 | A1 * | 8/2005 | Hicklin et al. ................... | 703/11 |
| 2005/0187747 | A1 * | 8/2005 | Paxson et al. ..................... | 703/11 |
| 2005/0193269 | A1 * | 9/2005 | Haswell et al. .................. | 714/38 |
| 2006/0003303 | A1 | 1/2006 | Almond et al. | |
| 2006/0037037 | A1 * | 2/2006 | Miranz .............................. | 725/2 |
| 2006/0107158 | A1 * | 5/2006 | Mishra et al. .................. | 714/741 |
| 2006/0117274 | A1 * | 6/2006 | Tseng et al. ....................... | 716/1 |
| 2006/0136138 | A1 * | 6/2006 | Hicklin et al. ................... | 702/19 |
| 2006/0212540 | A1 * | 9/2006 | Chon et al. ..................... | 709/218 |
| 2007/0156420 | A1 * | 7/2007 | Meier et al. ....................... | 705/1 |
| 2007/0250299 | A1 * | 10/2007 | Paxson et al. ..................... | 703/11 |

OTHER PUBLICATIONS

Alyokhin et al., "Coverage metrics for continuous functioncharts", IEEE 2004.*
Co-pending U.S. Appl. No. 11/842,135, filed Aug. 21, 2007 entitled "Test Postcondition Items for Automated Analysis and Test Generation" by William J. Aldrich, 65 pages.
Co-pending U.S. Appl. No. 11/433,611, filed May 12, 2006 entitled "Test Postcondition Items for Automated Analysis and Test Generation" by William J. Aldrich, 65 pages.

\* cited by examiner

*Primary Examiner* — Kandasamy Thangavelu
(74) *Attorney, Agent, or Firm* — Harrity & Harrity, LLP

(57) ABSTRACT

In one embodiment, a design is verified by creating a graphical model with a graphical modeling tool executing on a computing device. The graphical model may include a plurality of model elements. A postcondition element is coupled to a selected model element of the plurality of model elements. The postcondition element is associated with a desired result. The graphical model is employed to generate an executable form of the design. The executable form of the design and an indication of the desired result are provided to a verification tool, to instruct the verification tool to implement one or more verification scenarios.

20 Claims, 13 Drawing Sheets

TEST POSTCONDITION ITEMS FOR AUTOMATED ANALYSIS AND TEST GENERATION

RELATED APPLICATIONS

This application is a continuation of copending U.S. patent application Ser. No. 11/842,135 which was filed on Aug. 21, 2007, which is a continuation of copending U.S. patent application Ser. No. 11/433,611 which was filed on May 12, 2006 which is related to application Ser. No. 11/096,528 filed on Mar. 31, 2005 the contents of which are incorporated by reference in their entirety herein.

TECHNICAL FIELD

The present invention generally relates to associating a postcondition element with a model-based design represented by a graphical model for use by a verification tool in verifying the model-based design.

BACKGROUND INFORMATION

Graphical modeling environments are products that enable a user to construct and analyze a model of a process or system. Examples of graphical modeling formalisms for which graphical modeling environments exist include time-based block diagrams, such as those supported by Simulink® from The MathWorks Inc., discrete event diagrams and reactive state machine diagrams, such as those supported by Stateflow® also available from The MathWorks, Inc., entity flow diagrams such as those supported by SimEvents, available from The MathWorks, Inc., data-flow diagrams, such as LabVIEW, available from National Instruments Corporation, and software diagrams and other graphical programming environments, such as Unified Modeling Language (UML) diagrams.

A graphical modeling environment can produce model-based designs in graphical form, such as a block diagram model, to specify computations, operations, or functionality that can be performed on computational hardware such as a general purpose processor, microcontroller, digital signal processor (DSP), field programmable gate array (FPGA), application specific integrated circuit (ASIC), asynchronous processor, analog hardware, quantum computer, or biocomputer. As a design specification, a model-based design can drive the building process of an implementation of the design. For instance, the model-based design can be a block diagram model that acts as a specification from which to automatically generate code to provide an executable for testing and verification on a target system.

Model-based designs represented by graphical models can be tested using simulation. The simulation may be provided by the modeling environment. For example, Simulink® from The MathWorks, Inc. of Natick, Mass., provides an environment for simulating graphical models to test the model-based design. Simulation may be used by a model designer to identify design issues during the design stage at the system level. Although simulation may be used to functionally verify some behavior of the design, simulation may not be exhaustive such that it covers all desired or unwanted circumstances and occurrences of design behavior.

Verification tools can be used to provide a more formal and comprehensive approach to testing and verifying a model-based design. Verification tools are available that apply various formal methods and techniques for providing comprehensive coverage and verifying the behavior of a model-based design under test. The verification tool may run a multitude of combinations of scenarios with a significant portion or all of the possible input values. Running comprehensive or multiple verification scenarios in a verification tool may be time consuming and resource intensive. The techniques and methods used by the verification tool may exercise behavior or functionality that is not of concern to the model-based designer or that is not practical or realistic in the intended application of the implementation of the model-based design. Alternatively, the designer may want to concentrate on a specific class of behavior. Therefore, it may be time consuming, resource intensive or inconvenient to obtain or review the results of the portion of the verification that is of interest to the designer or realistic for the design.

Typically, the configuration of the verification may be performed in the verification tool to run certain tests or verification scenarios desired for the design. The verification tool may be configured to limit the verification scenarios or to cover only a certain combination of occurrences. Generating verification scenarios in a verification tool may consume significant time and resources. The verification tool may have its own configuration environment and language different than the graphical modeling environment. As such, any verification scenario configuration and verification results may be described in terms of the form, language, and context of the verification tool. Thus, it may be challenging to relate the verification scenario configuration and verification results to the model-based design represented by the graphical model.

Previous solutions, such as application Ser. No. 11/096, 528 entitled "Test Precondition Items for Automated Analysis and Test Generation," filed on Mar. 31, 2005, have focused on providing preconditions on the verification of a design. This typically involves providing specific inputs or ranges of inputs to be used in the verification process. These provide the advantage of focusing the verification by placing constraints on the testing or verification. One disadvantage of such an implementation is that in order to test if a design behaves or functions as desired, the designer must provide the proper inputs or preconditions that are necessary to cause the design to provide a desired result or behavior.

SUMMARY OF THE INVENTION

The present invention provides methods and systems for using an element in a graphical model to represent and identify a postcondition for use by a verification tool in verifying the execution behavior of the graphical model. The postcondition element provides a specification of a desired result or objective of the design without affecting the behavior of or altering the model. The desired result may be tested for by the verification tool in verifying the model. That is, the postcondition element provides a mechanism and formalism in a model-based design approach that is used to focus or direct automatically generated tests or verification of the design represented by the graphical model.

The postcondition element may be used to ensure that the verification covers the more meaningful, interesting, or practical scenarios of the behavior of the system under design and that the design can achieve performance or behavior goals. The postcondition element assists a designer in performing guided design exploration of areas of interest via formal analysis. In summary, the postcondition element of the present invention provides a mechanism for the designer in the modeling environment to provide instructions or directives to a verification or testing tool to verify or test the design by providing objectives or goals for the verification as opposed to constraints or limitations (i.e. preconditions).

In one aspect, the present invention is related to, a method, in a graphical modeling environment, of identifying a postcondition for verification. The method involves associating an element representing a postcondition with a portion of a graphical model and indicating in the associated element a desired result for verification.

In another aspect, the element is ignored during execution of the model-based design of the graphical model, for example, when simulating the model-based design or when generating code for targeted execution. The element may comprise a textual and/or graphical representation of the postcondition. Also, the element may be configurable to specify the goal or desired result. For the example, the element may be configured to have the postcondition either be active or inactive for verification. In another embodiment the element may be activated or deactivated based on conditions of the model design during execution.

In yet a further aspect of the present invention, the graphical model may be processed into a form readable by a verification tool. The processed form may include a specification of the desired result of the postcondition represented by the element. For example, an executable form of the design represented by the graphical model may be generated along with a postcondition specification to be used by a verification tool. Additionally, the method of the present invention may also include associating elements representing different postconditions with one or more portions of the graphical model at one or more hierarchical levels of the graphical model or with elements external to the model.

In one aspect, the present invention relates to a device readable medium having device readable instructions to execute the steps of the method, as described above, related to providing an element associated with a model-based design represented by a graphical model to identify a postcondition for verification of the model-based design.

In an additional aspect, the present invention relates to transmitting via a transmission medium computer data signals representing device readable instructions to execute the steps of the method, as described above, related to providing an element associated with a model-based design represented by a graphical model to identify a postcondition for verification in the model-based design.

In another aspect, the present invention relates to a method for verifying a model-based design represented by a graphical model and associated with a postcondition for executing the verification. The method includes the step of providing a graphical model representing a model-based design. The graphical model may include an element identifying a postcondition associated with a portion of the model-based design. The postcondition indicates or specifies a desired result to be achieved or tested by a verification tool in verifying the model-based design. The method further includes processing the graphical model into an executable form of the model-based design for verification by the verification tool, and providing the element in a form of a desired result to be achieved by the verification tool in execution of the executable form to verify the model-based design.

In another aspect, the method of the present invention also includes achieving or testing for the desired result of the postcondition represented by the element during the execution of the executable form of the model-based design. In some aspects, the element does not alter the executable form of the model-based design or change the execution behavior of the model-based design.

In one aspect, the present invention relates to a device readable medium having device readable instructions to execute the steps of the method, as described above, related to verifying a model-based design represented by a graphical model and associated with a postcondition for executing the verification.

In an additional aspect, the present invention relates to transmitting via a transmission medium computer data signals representing device readable instructions to execute the steps of the method, as described above, related to verifying a model-based design represented by a graphical model and associated with a postcondition for executing the verification.

In another aspect, the present invention relates to a system for providing an element associated with a graphical model representing a model-based design to identify a postcondition for verification of the model-based design. The model-based design may be verified by a verification or testing tool. The system includes a modeling environment, a configuration mechanism, and a verification tool. The modeling environment provides a graphical model representing a model-based design. The configuration mechanism may be used to associate an element representing a postcondition with a portion of the graphical model. The element may include or provide information specifying or otherwise indicating a desired result of the postcondition to be achieved or tested for in a verification of the model-based design.

Additionally, the verification tool in the system of the present invention obtains or uses an executable form of the model-based design of the graphical model for verification, and also obtains a form of the desired result of the postcondition represented by the element. The form of the constraint may be applied by the verification tool to execution of the model-based design in executable form.

The details of various embodiments of the invention are set forth in the accompanying drawings and the description below.

BRIEF DESCRIPTION OF THE DRAWINGS

The foregoing and other objects, aspects, features, and advantages of the invention will become more apparent and may be better understood by referring to the following description taken in conjunction with the accompanying drawings, in which.

DETAILED DESCRIPTION

Figure 1:
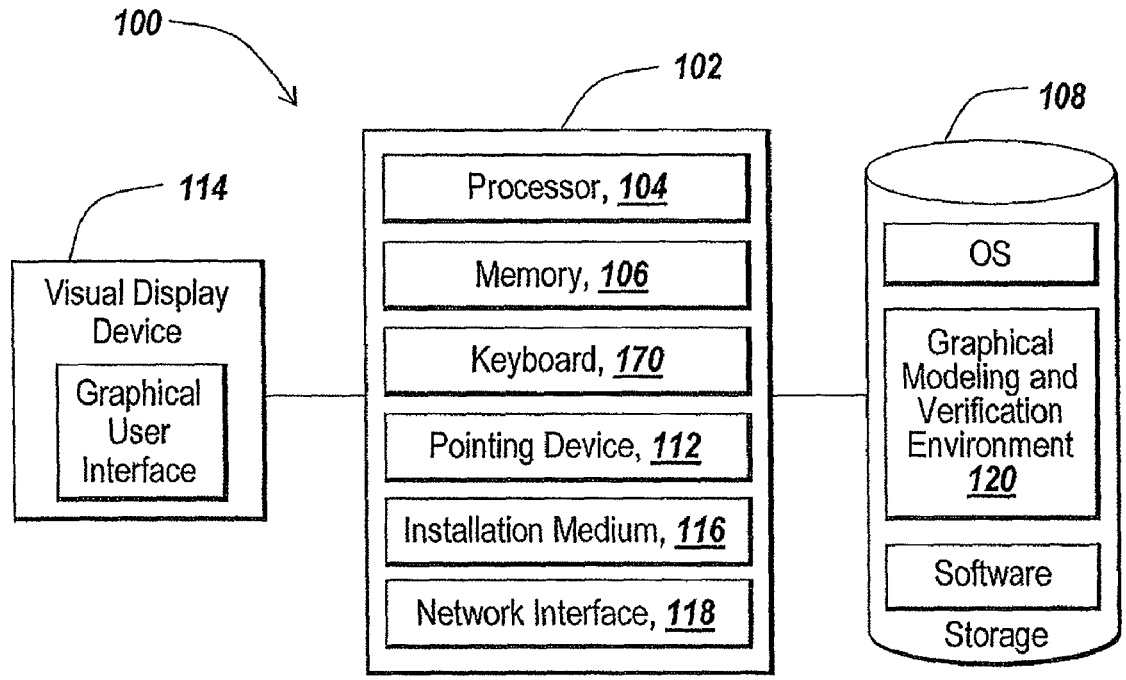
FIG. 1 is a block diagram of an illustrative computing device for practicing an embodiment of the present invention.

The illustrative embodiment of the present invention provides systems and methods for using an element in a graphical model to represent and identify a postcondition for use by a verification tool in verifying an executable form of the design represented by the graphical model. The postcondition element provides a specification of a desired result or objective to be achieved or tested for by the verification tool in the verification of the design without affecting the behavior of the design. The postcondition element may not be incorporated directly into the model-based design represented by the graphical model but may be associated with graphical model elements as a design specification for verification. Additionally, the postcondition element may be configurable to provide different logics for the desired result and can be set to be active or inactive. As the graphical model may reference or otherwise have a hierarchy of graphical models, there may be multiple postcondition elements at one level of the hierarchy of at any of the levels of the hierarchy of the graphical model.

Furthermore, the illustrative embodiment of the present invention may automatically process the model-based design represented by the graphical model into an executable form and provide a specification of the desired result of the postcondition for use by a verification tool. The generated code may be compiled and built into a form executable by a target operating and processor environment or by a target verification tool. The desired results of the postcondition may be specified in a language or in a format readable and applicable by the verification tool. In verification, the verification tool may execute the executable form of the model-based design and test for the desired results specified via the postcondition element.

In the illustrative embodiment of the present invention, the postcondition element provides a mechanism and formalism that may be used to guide or direct automatically generated tests or verification of the design represented by the graphical model. The postcondition element may be used to focus verification to the more meaningful, interesting, or practical scenarios of the behavior of the system under design. Also, the postcondition element may be used to provide test or verification execution patterns to be more realistic in the context of the system and the system's environment. Furthermore, the postcondition element may improve the performance of verification by reducing the combinations or occurrences of executions to provide the desired verification coverage. Additionally, the postcondition element may help a designer perform guided design exploration of areas of interest via formal analysis. In general, the postcondition element provides a mechanism for the designer in the modeling environment to provide objectives or goals to a verification or testing tool to verify or test the design in a certain way.

The illustrative embodiment will be described solely for illustrative purposes relative to a graphical modeling and verification environment provided by the software products from The MathWorks, Inc. of Natick, Mass. Although the illustrative embodiment will be described relative to a MATLAB® and/or Simulink®-based application, including the use of Stateflow®, one of ordinary skill in the art will appreciate that the present invention may be applied to other graphical modeling and/or verification environments, such as any environments using software products of SimEvents, SimMechanics, SimPowerSystems or SimDriveline from The MathWorks, Inc. of Natick, Mass., LabVIEW® or MATRIXx from National Instruments, Inc., MSC.Adams® from MSC.Software Corporation of Santa Ana, Calif., Virtuoso from Cadence of San Jose, Calif., Dymola from Dynasim AB of Lund, Sweden, or Rational Rose from IBM of White Plains, N.Y. and Rhopsody and Tau from Telelogic.

FIG. 1 depicts an environment suitable for practicing an illustrative embodiment of the present invention. The environment includes a computing device 102 having memory 106, on which software according to one embodiment of the present invention may be stored, a processor (CPUs) 104 for executing software stored in the memory 106, and other programs for controlling system hardware. One of ordinary skill in the art will appreciate that the processor 104 may be a multiple core processor, multiple processors, or other hardware component with computational capability, such as a microcontroller, application specific integrated circuit, field-programmable gate arrays, virtual machines or the like or any combination thereof. The memory 106 may comprise a computer system memory or random access memory such as DRAM, SRAM, EDO RAM, etc. The memory 106 may comprise other types of memory as well, or combinations thereof. A human user may interact with the computing device 102 through a visual display device 114 such as a computer monitor, which may be used to display a graphical user interface (GUI).

The computing device 102 may include other I/O devices such a keyboard 110 and a pointing device 112, for example a mouse, for receiving input from a user. Optionally, the keyboard 110 and the pointing device 112 may be connected to the visual display device 114. Additionally, the computing device 102 may include any type of input device for receiving user input, such as a joystick. In other embodiments, the computing device 102 may include any type of haptic or tactile feedback device, such as a vibration generating mouse, or a force feedback device such as a force feedback joystick. Also, the computing device 102 may include any type of sound producing I/O device such as any suitable sound card. The computing device 102 may include other suitable conventional I/O peripherals.

For installing software programs, the computing device 102 may support any suitable device readable medium 116, such as a CD-ROM, DVD-ROM floppy disks, tape device, USB device, hard-drive, memory card, or any other suitable device. The computing device 102 may further comprise a storage device 108, such as a hard-drive, flash memory, or CD-ROM, for storing an operating system and other related software. The present invention of a graphical modeling and verification environment 120 may comprise software that is installed via a device readable medium 116 and stored in the storage device 108. Additionally, the operating system and graphical modeling and verification environment 120 may be run from a bootable CD, DVD, or ROM.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISD, Frame Relay, ATM), cluster interconnection (Myrinet), peripheral component interconnections (PCI, PCI-X), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 118 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

Figure 2A:
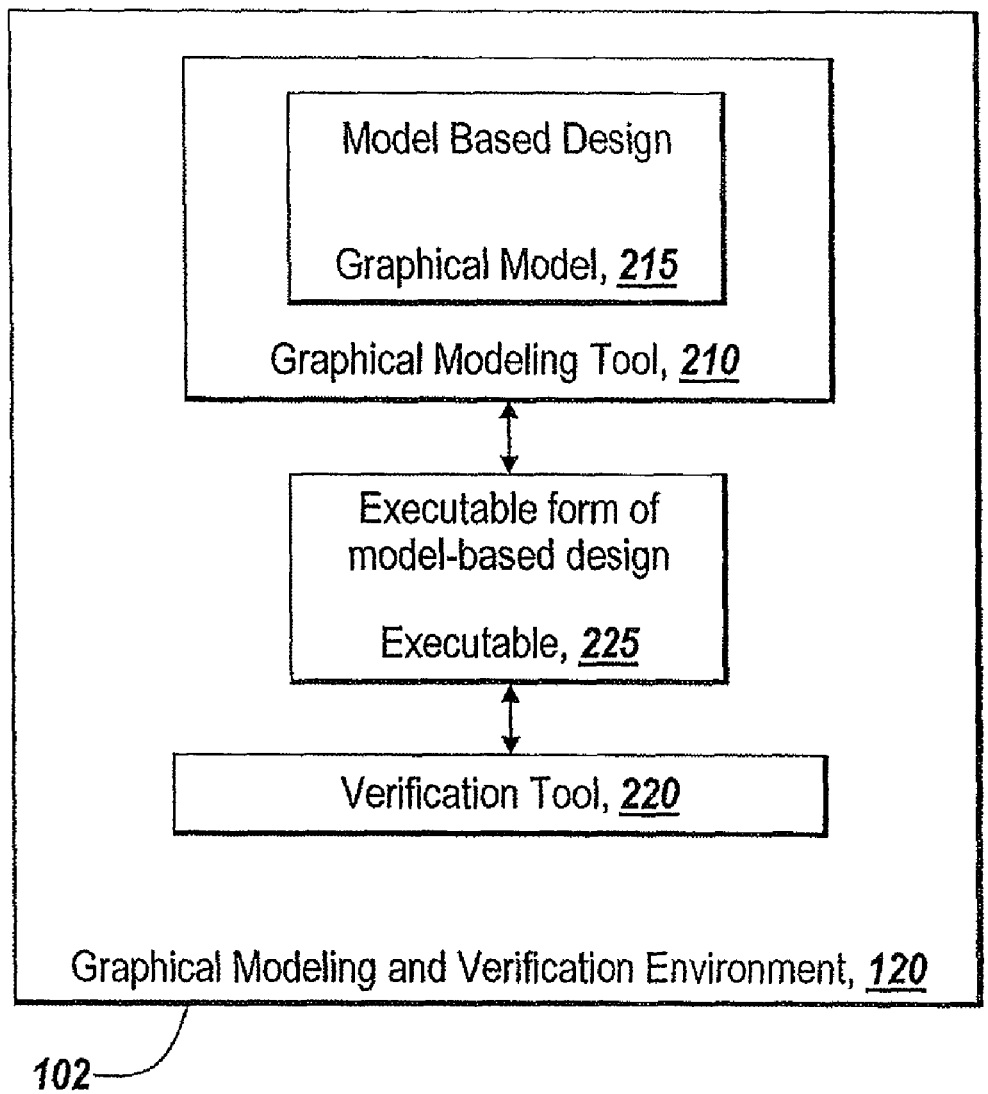
FIG. 2A is a block diagram of an illustrative graphical modeling and verification environment for practicing an embodiment of the present invention on the computing device of FIG. 1.

In one aspect, the present invention is related to a graphical modeling and verification environment 120 as illustrated in FIG. 2A. In brief overview, the illustrative graphical modeling and verification environment 120 includes a graphical modeling tool 210 and a verification tool 220. The graphical modeling tool 210 provides an environment for the design and development of a model-based design represented by a graphical model 215. The verification tool 220 provides an environment for the test, analysis, and verification of an executable form 225 of the model-based design represented by the graphical model 215. The verification tool 220 may be in communication with or have any suitable type and/or form of interface to the graphical modeling tool 210.

The graphical modeling tool 210 of the present invention comprises an environment for creating, editing, designing, simulating, testing, or otherwise providing any type and/or form of graphical model 215, such as block diagram model. In an exemplary embodiment and by way of example, the graphical modeling tool 210 may comprise Simulink®, Stateflow®, SimEvents, and/or SimMechanics manufactured by The MathWorks, Inc. of Natick, Mass. In the graphical modeling tool 210, configurable and customizable functional blocks are used to create block diagram models that may represent a design, or algorithm, for a control system, a signal processing system, a communication system, any other time-varying or dynamic system, physical or conceptual, any computational hardware device, or any software implementation. The graphical modeling tool 210 can be used to provide a model-based design approach to implementation of an item or system under design. A model-based design may be used as a design specification for an implementation, such as an implementation of a mechanical apparatus, biological organism, an algorithm in hardware circuitry or the implementation of code or software to run on a processor.

Additionally, the graphical modeling tool 210 may comprise an automatic code generation application, such as the automatic code generator of Real-Time Workshop® from The MathWorks, Inc. of Natick, Mass., to generate source code from a graphical model 215 to translate the functionality of the graphical model 215 into an executable form, such as a program, that may be designed to run on any microprocessor, real-time operating system, or otherwise customized to run on a specific target hardware platform or for use by a verification tool 220.

The graphical model 215 of the present invention can comprise any type and/or form of graphical model 215. The graphical modeling tool 215 may provide any type of tools, libraries, and/or configuration mechanisms to graphically create and/or edit a graphical model 215. In an exemplary embodiment, the graphical model 215 may comprise a block diagram model provided by the Simulink® environment of The MathWorks, Inc. For example, the block diagram model 215 may comprise a series of different type of blocks arranged in a desired manner and connected via connection lines to represent signal values traversing the blocks. The graphical model 215 may comprise any type of element or construct to form a graphical model, such as connectors, blocks, or any other graphical form and representation of functionality supported by the graphical modeling tool 210. One ordinarily skilled in the art will recognize and appreciate the various forms of graphical models, and the elements and content of the models thereof.

Additionally, the graphical modeling tool 210 of the present invention may comprise a design and development environment for creating a state transition diagram representation in the graphical model 215. In an exemplary embodiment and by way of example, the graphical modeling tool 210 may comprise Stateflow®, an interactive design and simulation tool for event-driven systems manufactured by The MathWorks, Inc. of Natick, Mass. The graphical modeling tool 210, such as Stateflow®, provides elements to describe a language, logic, and systems in a visual form, such as a form that is readable, and understandable by a human user, such as a designer. In one embodiment of the present invention, the graphical modeling tool 210 provides a visual formalism of the item under design as represented by the graphical model 215.

In one embodiment, the graphical modeling tool 210 may be able to execute the graphical model 215. For example, in the exemplary embodiment of Simulink®, the graphical modeling tool 210 has an environment that provides for the simulation and debugging of the graphical model 215. Additionally, in other embodiments, the graphical modeling tool 210 may generate code of executable instructions representing the graphical model 215 to compile and build for executing on a target hardware platform and/or operating system. The graphical modeling tool 210 may comprise an automatic code generation application, such as the automatic code generator of Real-Time Workshop® from The MathWorks, Inc. of Natick, Mass., to generate source code from a graphical model 215 to translate the functionality of the graphical model 215 into an executable form 225, such as a program, that may be designed to run on any microprocessor, real-time operating system, or otherwise customized to run on a specific target hardware platform or for use by a verification tool 220.

Furthermore, the graphical modeling tool 210 may provide for implementation of any portion or any functionality of the graphical model 215 via instructions in any type of programming language, text-based, high-level, interpretative, or otherwise. In the exemplary embodiment of a MATLAB® and Simulink® based environment 120, the graphical modeling tool 210 may provide for or use executable instructions in the form of the textual programming language of MATLAB®. One ordinarily skilled in the art will recognize and appreciate that any type and/or form of executable instructions, including interpretive programming languages, markup languages such as the HyperText Markup Language, scripting languages, and any code, such as libraries, executables, or scripts, may be used in providing the graphical model 215 of the present invention.

In the illustrative embodiment of the present invention, the verification tool 220 of the present invention comprises a testing and verification environment for testing and verifying an executable form 225 of a design, such as a model-based-design represented by a graphical model 215 provided by the graphical modeling tool 210. In one embodiment, the executable form 225 of the design under test is provided by the automated code generator of the graphical modeling tool 210 as will be described in further detail later. The verification tool 220 may provide for the testing and verification of an executable 225 by any technique known to those ordinarily skilled in the art, such as, but not limited to, bounded model techniques, symbolic model techniques, test generation techniques, solving techniques, theorem proving techniques, temporal logic, exhaustive or deterministic techniques, or other mathematical or algorithm based techniques. In one aspect, the verification tool 220 may be described or referred to as using formal methods to perform formal verification of the executable 225 in comparison to simulating the graphical model 215 or corresponding executable form 225.

The verification tool 220 may be any type and/or form of verification tool 220. In some embodiments, the verification tool 220 may comprise any of the model-based test and verification related software products manufactured by Prover Technology AB of Stockholm, Sweden, Prover Technology, Inc. of San Mateo, Calif., Reactive Systems, Inc. of Falls Church, Va., or TNI-Software, part of the Valiosys Group with offices in Paris, France. In other embodiments, the verification tool 220 may comprise any custom verification tool 220 software or any portions of software that may be available to perform testing and verification. One ordinarily skilled in the art will recognize that the verification tool 220 may be any type and/or form of verification tool 220 and may use any type and/or form of testing or verification techniques, formal or otherwise.

The graphical modeling tool 210 and verification tool 220, and any portion thereof, can comprise an application, module, service, computer program, software component, web service, web component, library, or any other type and/or form of executable instruction which is designed to and capable of executing the functionality of the present invention as described herein. Additionally, the graphical modeling tool 210 and verification tool 220 may be configured to and capable of running any of the modules, libraries or software components of the MATLAB® and/or Simulink® product family. As such, the graphical modeling and verification environment 120 may have all or a portion of the software components of MATLAB® and/or Simulink® installed on the computing device 102, or alternatively, accessible from another computing device on a network.

In FIG. 2A, although the graphical modeling tool 210 and verification tool 220 are illustrated as separate tools, one ordinarily skilled in the art will recognize and appreciate that these tools 210 and 220 may be combined into a single application, or otherwise tightly integrated to present a single application in performing the operations of the present invention as described. Additionally, although the executable form 225 is illustrated as external to the graphical modeling tool 210 and the verification tool 220 in FIG. 2A, the executable form 225 may also reside in and/or execute in the environments of either the graphical modeling tool 210 and/or the verification tool 220. For example, the executable form 225 may comprise an interpretative programming language that is executed in a run-time environment of either the graphical modeling tool 210 and/or the verification tool 220

Figure 2B:
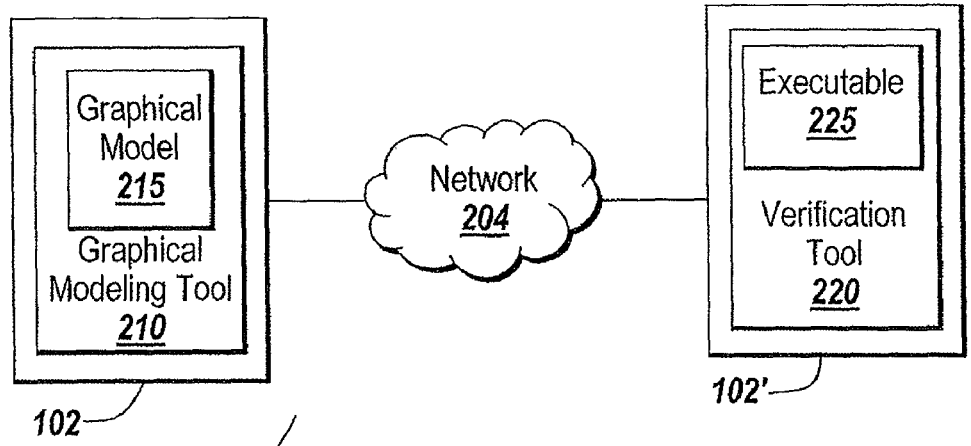
FIG. 2B is a block diagram of another illustrative graphical modeling and verification environment for practicing an embodiment of the present invention in a distributed manner.

FIG. 2B depicts another environment suitable for practicing an illustrative embodiment of present invention, wherein portions of the present invention are distributed in a network environment. In a broad overview, a system 200 depicts a network 204 environment for running portions of the graphical modeling and verification environment 120 of the present invention on multiple computing devices 102 and 102'. The system 200 includes multiple computing devices 102 and 102' connected to and communicating over a network 204. The network 204 can be a local area network (LAN), such as a company Intranet, a metropolitan area network (MAN), or a wide area network (WAN) such as the Internet. In one embodiment (not shown), the network 204 comprises separate networks, which may be of the same type or may be of different types. The topology of the network 204 over which the computing devices 102, 102', 102" communicate may be a bus, star, or ring network topology. The network 204 and network topology may be of any such network 204 or network topology capable of supporting the operations of the present invention described herein.

The computing devices 102 and 102' can connect to the network 204 through a variety of connections including standard telephone lines, LAN or WAN links (e.g., T1, T3, 56 kb, X.25, SNA, DECNET), broadband connections (ISDN, Frame Relay, ATM, Gigabit Ethernet, Ethernet-over-SONET), cluster interconnections (Myrinet), peripheral component interconnections (PCI, PCI-X), and wireless connections, or some combination of any or all of the above. Connections can be established using a variety of communication protocols (e.g., TCP/IP, IPX, SPX, NetBIOS, Ethernet, ARCNET, Fiber Distributed Data Interface (FDDI), RS232, IEEE 802.11, IEEE 802.11a, IEEE 802.11b, IEEE 802.11g, and direct asynchronous connections).

The network 204 and network connections may include any transmission medium between any of the computing devices 102 and 102' such as electrical wiring or cabling, fiber optics, electromagnetic radiation or via any other form of transmission medium capable of supporting the operations of the present invention described herein. The methods and systems of the present invention may also be embodied in the form of computer data signals, program code, or any other type of transmission, encrypted or not, that is transmitted over the transmission medium, or via any other form of transmission, which may be received, loaded into, and executed, or otherwise processed and used by a computing device 102, and 102' to practice the operations of the present invention as described herein.

Each of the computing devices 102 and 102' may be configured to and capable of running any portion of the graphical modeling and verification environment 120. In this example, the executable form 225 of the design is created at the verification tool 220 via series of Application Programming Interface (API) calls between the verification tool 220 and the graphical modeling tool 210. The graphical modeling and verification environment 120 and/or any portion thereof, such as the graphical modeling tool 210 and the verification tool 220, can be capable of and configured to operate on the operating system that may be running on any of the computing devices 102 and 102'. Each computing device 102 and 102' can be running the same or different operating systems. Additionally, the graphical modeling tool 210 and the verification tool 220 can be capable of and configured to operate on and take advantage of different processors of any of the computing devices 102 and 102'. One ordinarily skilled in the art will recognize the various combinations of operating systems and processors that can be running on any of the computing devices.

Figure 2C:
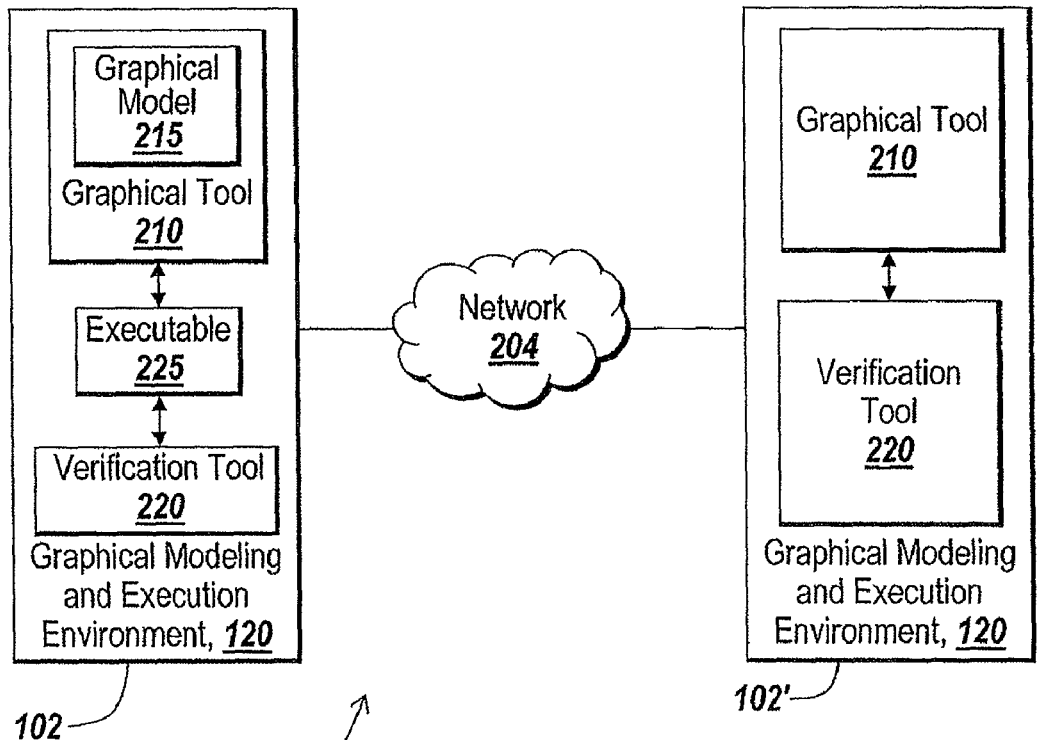
FIG. 2C is a block diagram of another illustrative graphical modeling and verification environment or practicing an embodiment of the present invention in a client/server environment.

FIG. 2C depicts another illustrative environment of an embodiment of the present invention, wherein portions of the present invention are practiced in a client/server architecture in a network environment. In a broad overview, the illustrative graphical modeling and verification environment 120 of the present invention includes a client computing device 102 connected to and in communication with a server computing device 102' over a network 204. The graphical modeling tool 210 and/or the verification tool 220 can be capable of and configured to have respective portions run on each of the client 102 and the server 102'. In one embodiment, the graphical modeling tool 210 may have a first portion running on the client 102 and a second portion 210' running on the server. For example, the graphical modeling tool 210 may have a client portion 210 on the client 102 for providing and displaying the graphical model 215, and a server portion 210' on the server 102' that may include application functionality and other processing, such as storing and/or retrieving portions of the graphical model 215 from a database. Likewise, in other embodiments, the verification tool 220 may also have a client portion 220 and a server portion 220'. One ordinarily skilled in the art will recognize and appreciate how the graphical modeling tool 210 and/or verification tool 220 may be capable of and configured to execute with a client portion and a server portion in a client/server architecture.

Additionally, the graphical modeling tool 210 and/or verification tool 220 may be deployed such that portions of the graphical model 215 and/or the executable 225 may execute on certain portions of the network 204 and/or on certain computing devices 102 or 102'. For example, some functionality of the graphical model 215 may be time critical or sensitive, and therefore may be targeted to execute on a computing device 102 and 102' and a segment or portion of the network 204 with desired performance and/or operating characteristics. Other functionality of the graphical model 215 may be less time-sensitive and may be targeted to be deployed to any computing device 102, 102' available on the network 204.

In summary, the graphical modeling tool 210 and verification tool 220 may be deployed across a wide range of different computing devices, different operating systems, and different processors. Furthermore, the graphical modeling tool 210 and verification tool 220 may be deployed in various distributed and/or client/server environments in various network topologies and configurations.

Figure 3A:
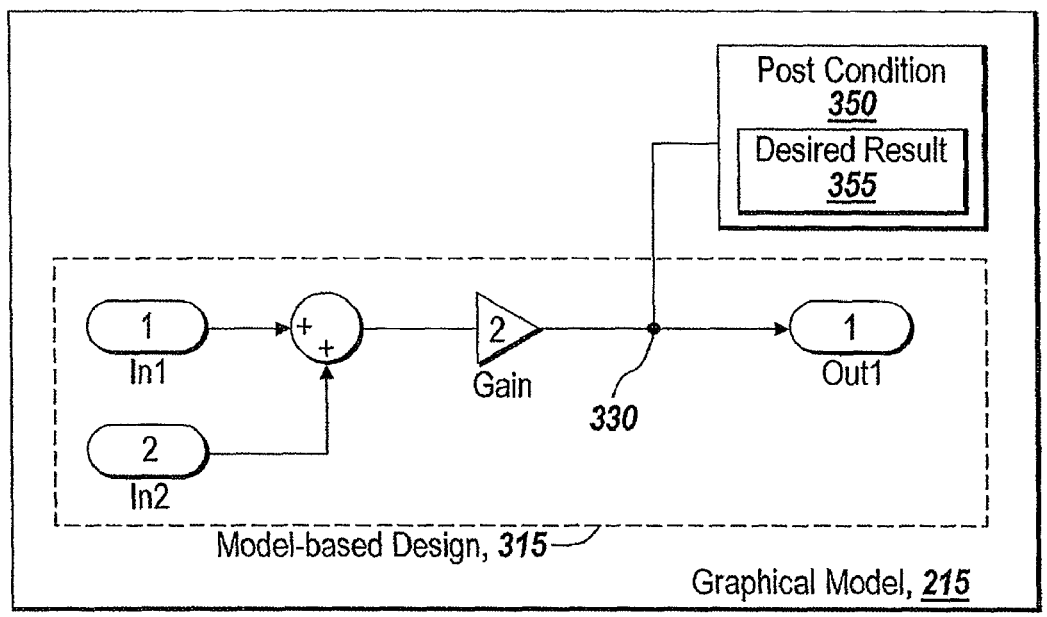
FIG. 3A is a diagrammatic view of an illustrative graphical model and postcondition element for practicing an embodiment of the present invention.

In one aspect, the present invention is directed towards providing an element in the graphical model to represent a postcondition for testing or verification in the model-based design represented by the graphical model 215. FIG. 3A depicts an illustrative graphical model 215 having a model-based design 315 and an element 350 in the graphical model 215 representing and identifying a postcondition. The element 350 may also be referred to as a postcondition element. The model-based design 315 portion of the graphical model 215 represents a design of a system, or other item or entity, which may be under design, test, or verification. For example, the model-based design 315 may be a block diagram model provided by the graphical modeling tool 210 of Simulink®. The model-based design 315 may also be referred to as the design. From another perspective, the model-based design 315 portion of the graphical model 215 is the content of the graphical model 215 prior to adding any postcondition element 350.

The postcondition element 350 provides a design mechanism and formalism for identifying and specifying a postcondition associated with the model-based design 315 of the graphical model 215. The postcondition element 350 is directed towards indicating to a testing or verification tool, or any other system, a postcondition to be achieved or tested for during execution of a, test, verification, or simulation of the model-based design 315, such as via an executable form 225. In one aspect, a postcondition may not be intended to affect the behavior of the design 315 of the graphical model 215 but to provide objectives, criteria or goals for the execution of the design, or to provide objectives, criteria or goals to the execution space of the design under test or verification. The postcondition element 250 is depicted in FIG. 3A as separate and external to the model-based design 350 to illustrate that the postcondition element 350 is a element used to associate a postcondition with a model-based design 315 without affecting, altering, or otherwise being intrusive to the behavior of the model-based design 315. Although shown external to the model-based design 315 for illustrative purposes; as will be discussed later, the postcondition element 350 may be incorporated into the model-based design 315, or any element thereof, in a manner that does not affect the behavior of the model-based design 315. For example, in an exemplary embodiment, the graphical modeling tool 210 may provide a simulation environment for simulating the graphical model 215. While simulating the graphical model 215, the graphical modeling tool 210 may ignore or otherwise not consider or use the postcondition element 350 for simulating the graphical model 215. In other embodiments the postcondition, element 350 maybe used by applications other than the verification tool 220. For example, parameter estimation tools could test for a postcondition and abort a simulation when the target range is exceeded.

A postcondition may be considered a desired result, criteria, target, objective, or goal that should be achieved during execution of the executable form 225 of the design 315. That is, the desired result of the postcondition provides a goal, objective, or target for the design and verification process by indicating how the design should behave or perform. Using this information the verification tool can test or verify the design to make sure it can achieve the desired result or criteria. This simplifies the design process for the user by reducing the need for the user to know and specify the required inputs or preconditions that would cause the design to achieve or test for the desired results or criteria. Although one ordinarily skilled in the art will recognize and appreciate all the combinations of uses of a postcondition in testing or verification, one ordinarily skilled in the art will also recognize and appreciate that the postcondition element 350 of the present invention generally provides an instruction or directive for a test or verification system, such as the verification tool 220, for performing a test or verification on the executable form 225 of the design 315.

Figure 3B:
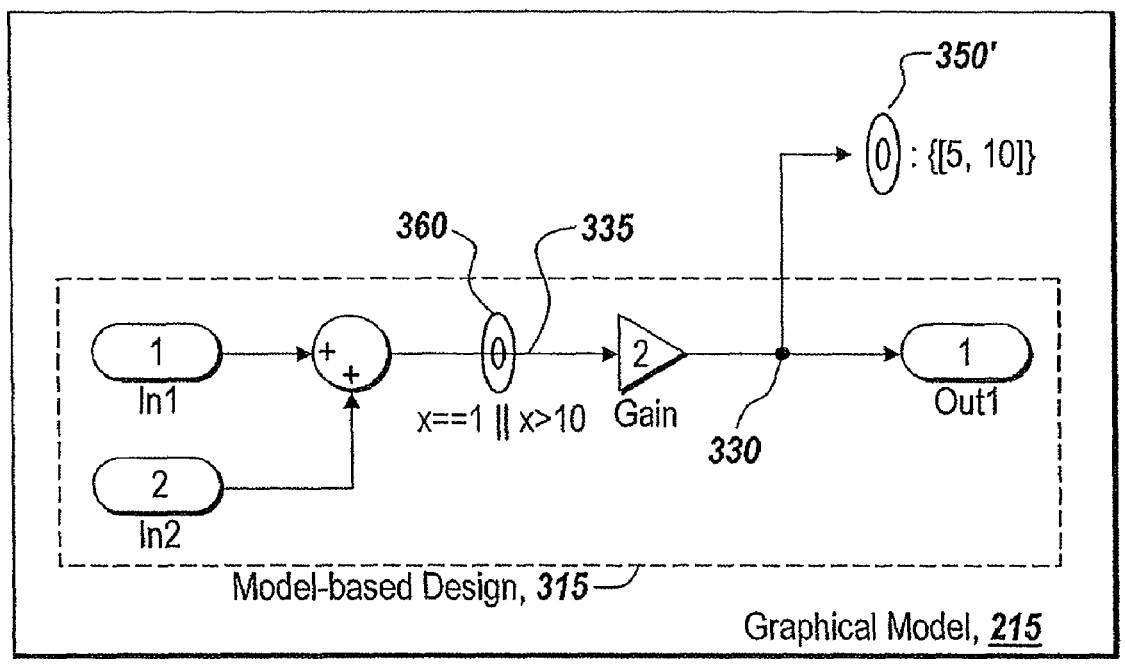
FIG. 3B is a diagrammatic view of an illustrative graphical model and additional illustrative embodiments of the postcondition element of the present invention.

The postcondition element 350 may comprise any type and/or form of a textual or graphical element that can be associated with a graphical model 215 or any portion of the model-based design 315. In one embodiment, the postcondition element 350 may be a graphical element or construct, such as a postcondition block of a block diagram model, or an icon, image, or other graphical form. The postcondition element 350 may provide a visual cue and comprise a highlight, a border, an animation, a change in color or font, an asterisk, an element shimmer, or any other type and/or form of a visual cue. By way of example, the postcondition element 350 associated with graphical model 215 of FIG. 3B illustrates a visual cue such as a target icon 350'. One ordinarily skilled in the art will recognize and appreciate the postcondition element 350 for graphical model 215 maybe any type and/or form of visual cue In other embodiments, the postcondition element 350 may also be associated with any auditory, tactile or force-feedback cues, such as any sound produce-able from the computing device 102 or any sensory output produce-able from a haptic or touch feedback device of the computing device 102. Additionally, a postcondition element like the postcondition element 360 may be associated with a model element, such as the output signal 330 of the model-based design 315 as illustrated in the graphical model 215 of FIG. 3B.

In other embodiments, the postcondition element 350 may comprise a textual representation, such as illustrated by alphanumeric characters associated with an element of the model-based design 315. In other cases, the postcondition element 350 may be represented and comprise a portion of one or more elements of the model-based design 315, such as a textual representation, indicator or configuration of the element of the model-based design. For example, a signal line, such a signal 335 in FIG. 3B, may be configured to include a postcondition. As such, the signal line may include graphical or textual information in the signal's configuration that represents or identifies the postcondition as discussed in more detail in conjunction with FIG. 3F below. Additionally, a graphical or textual indicator 360 associated with an element of the model-based design 315, such as signal line 335, may be visually depicted in the graphical model 215. Furthermore, the postcondition element 350 may comprise any combination of textual or graphical representation that may or may not be visible in the graphical model 215. The postcondition element 350 may also be associated with multiple elements.

Figure 3C:
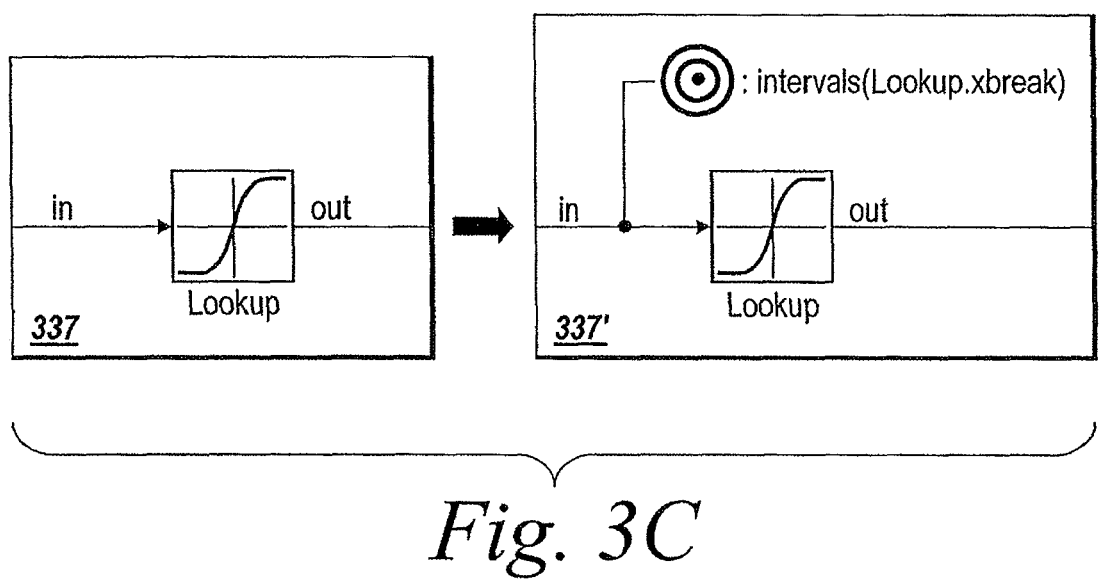
FIG. 3C is an example of a block element and a corresponding template element having a preconfigured postcondition element.

The postcondition element 350 may also include or be associated with information of desired result, or criteria 355 to identify, define, specify, reference, or otherwise provide the definition, specification, or instruction of the postcondition. The desired result 355 may be created, defiled, specified, or otherwise provided by any type and/or form of graphical or textual expression. In one embodiment, the postcondition element 350 may provide a pre-determined or fixed set of desired result information. For example, the graphical modeling tool 210 may provide a library of postcondition elements 350 that provide one or more constraints based on any operating, performance, modeling, system, environment, or other constraints known for a specific domain or system or for a component of the design 315 under consideration. In another example, the postcondition element 350 may provide a pre-determined or fixed constraint 355 that is further configurable or changeable. In this manner, the postcondition element 350 may provide a template for a constraint 355 to be used as is or to be further modified for the desired use. For example, in a design including a look-up table, a user may want to ensure that for every instance in a look-up table in the design every interpolation interval must be tested or demonstrated. An example of this can be seen in FIG. 3C wherein the instance of a look-up table 337 is replaced with a look-up table 337' template with a predefined postcondition specifying that each interpolation interval is to be tested.

In another embodiment, the postcondition element 350 may be configurable to allow the desired result 355 to be defined or provided either programmatically via any application programming interface (API) or by a user via an input device. In one embodiment, the postcondition element 350 may provide or include a configuration mechanism, such as graphical user interface or command line interface, for receiving user input or selections for defining the constraint of the postcondition. For example, the user interface may provide a list of one or more business rules for selection in defining the postcondition of the postcondition element 350. Additionally, in some embodiments, the postcondition element 350 may be configurable to be set to or changed to an active or inactive state. Instead of removing postcondition elements 350 that may not be desired to be used in certain cases, the postcondition element 350 may remain associated with the model-based design 315 but not used.

In another embodiment, the postcondition element 350 may be remotely accessed, for example through a URL. Thus, when referencing the performance characteristics of a model design, a link to the postcondition element 350 can be provided. In certain embodiments, the link may likewise be used to configure the desired results 355 or other aspects of the postcondition element 350.

The desired results 355 of the postcondition element 350 may be expressed or specified in any type and/or form of graphical or textual language. In the exemplary embodiment of Simulink® and Stateflow®, the desired results 355 may be defined using any function, API, language statement, block, state diagram element, graphical construct, and/or graphical function provided by the graphical modeling tool 210. In one embodiment, the desired result 355 may be specified using the high-level textual programming language of MATLAB®. In another embodiment, the desired result 355 may be specified in a language or in a format used by the verification tool 220. For example, the desired result 355 may be specified textually as a string to include text in a format or syntax known by or understandable by the verification tool 220. One ordinarily skilled in the art will recognize and appreciate that any type and/or form of graphical or textual instruction, including interpretive or non-interpretive programming languages, markup languages such as the HyperText Markup Language, scripting languages, Object Constraint Language (OCL) or a custom syntax and language may be used in providing the desired result 355 of the present invention.

Additionally, the desired result 355 may be expressed as any type and/or form of logic or condition to provide the desired postcondition result. In one embodiment, the desired result 355 may be specified as a value or range of values to set an input, parameter, argument, variable, property, attribute, or other settable data element related to the model-based design 315 or the execution of the model-based design 315 in execution form 225. The value, set, or range of values may include any data type, such as a Boolean, string, integer, binary, array, real or complex number, enumeration; data structure, object, scalar and/or vector, of any size and/or dimension. Also, the value or range of values may be specified in an-inclusive or exclusive manner. For example, a desired result 355 for a signal input of a block diagram model 215 may be specified that it should be equal to a value or range of values, e.g., inclusive manner, or should not be set to a value or range of values, e.g., an exclusive manner. In some embodiments subsets within values can be provided for additional verification. The desired result 355 may also be expressed as conditional logic where a value of a data element of the model-based design 315 is tested based on the state, status, or value of another data element of the model-based design 315. For example, the desired result 355 may be expressed as if-then, if-then-else, or any other type of if, case, select or logic conditional statement as known by those ordinarily skilled in the art. The desired result may also be any combination of any of the above mentioned specifications, expressions or configurations.

Figure 3D:
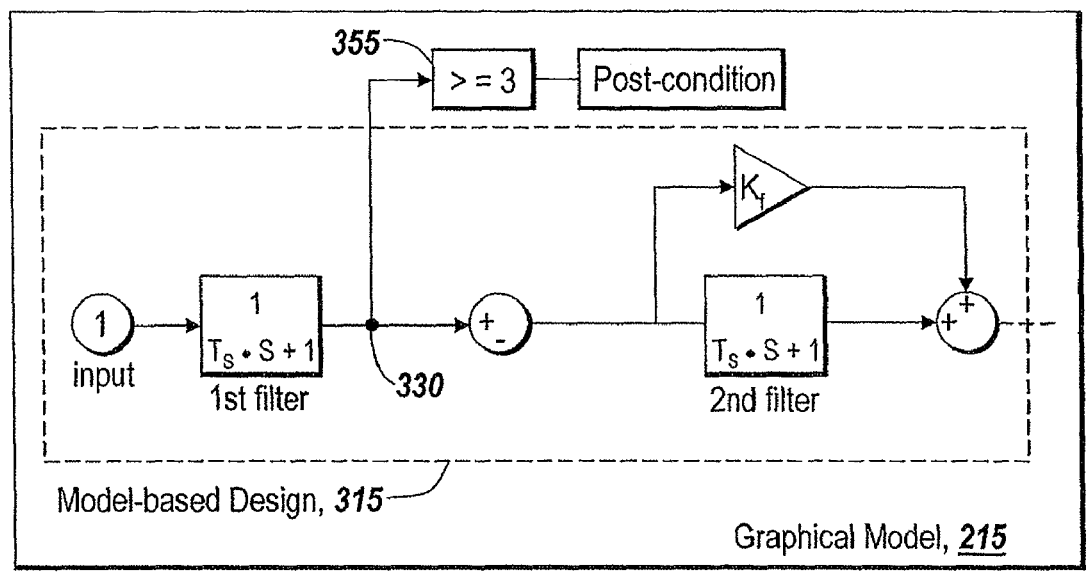
FIG. 3D is a diagrammatic view of another illustrative graphical model and postcondition element for practicing another embodiment of the present invention.

Referring now to FIG. 3D, an illustrative postcondition element 350 is depicted with an illustrative model-based design 315 of a graphical model 215. The model-based design 315 of FIG. 3D depicts a graphical model 215 in the form of a block diagram model, such as a model provided by Simulink®, including multiple functional blocks connected together via signal lines as known by those ordinarily skilled in the art. A postcondition element 350 and desired result 355 may be associated with an element of the model-based design

315. In the illustrated example, the postcondition is associated with the signal 330 output from the first filter of the design 315. The desired result 355 of ">=3" indicates a postcondition that the design 315 is to be tested for during verification. That is, in this instance the user wishes to test for conditions when the value of output signal 330 is equal to or greater then 3 in whatever units are relevant to the output signal 330 or the design 315. The postcondition 350 and desired result 355 provide an instruction to a verification tool 220 that may execute an executable form 225 of the design 315 to perform verification to test for the case where the value of output signal 330 is greater than or equal to 3. In this manner, the user is not required to know and define what inputs would cause the desired results for verification. Thus various inputs or scenarios are tested by the verification tool to achieve the desired result.

As illustrated in FIG. 3D, the postcondition element 350 may be separated into multiple elements or constructs, graphical or textual, having a portion representing an identifier of a postcondition 350 and a portion specifying the desired result 355. Additionally, one or more desired results 355 may be specified for a single postcondition element 350. The one or more desired results 355 may be applied in combination as a logical conditional for the postcondition element 355 by, for example, via a logical OR or AND function. For example, one desired result 355 may be exclusively OR'd with another desired result 355 to provide a result desired for the postcondition. In other embodiments, a desired result 355 may be associated or used with multiple postcondition elements 350. Although FIG. 3D illustrates separated parts of the postcondition element 350, one or more desired results 355 may form and be included or otherwise incorporated in a single postcondition element 350. One ordinarily skilled in the art will recognize and appreciate the postcondition element 350 and desired result 355 may take many visual, textual and/or configurable forms in practicing the operations of the present invention as described herein.

Although the postcondition element 350 is depicted in FIG. 3D as associated with a signal output 330 of the design 315, the postcondition element 350 may be associated with any portion or element of the design 315. The postcondition element 350 may be associated with or provide a postcondition for any element of the graphical model 315 in the terms and granularity of the graphical model 215 as may be provided by the graphical modeling tool 210. For example, in the exemplary embodiment of Simulink® and/or Stateflow®, the postcondition element 350 may be provided for any signal, block, state, object, and any other element used to provide a design 315. Likewise, the constraint 355 of the postcondition element 355 may use or reference any data element accessible via the graphical model 215 or graphical modeling tool 210. For example, in the exemplary embodiment of Simulink® and/or Stateflow®, the desired result 355 may use or reference any signal value, signal attribute, MATLAB® workspace variable, function, parameter, argument, application programming interface (API), object property, block data element, masked subsystem workspace variable, state diagram element, or any other data element available in Simulink® and/or Stateflow® including system information such as memory usage, CPU load, clock time, or the like. One ordinarily skilled in the art will recognize and appreciate that the postcondition element 350 and desired result 355 may be applied in a manner relevant to the context, terms, elements, design, and environment provided by the graphical model 215 and/or graphical modeling tool 210.

Figure 3E:
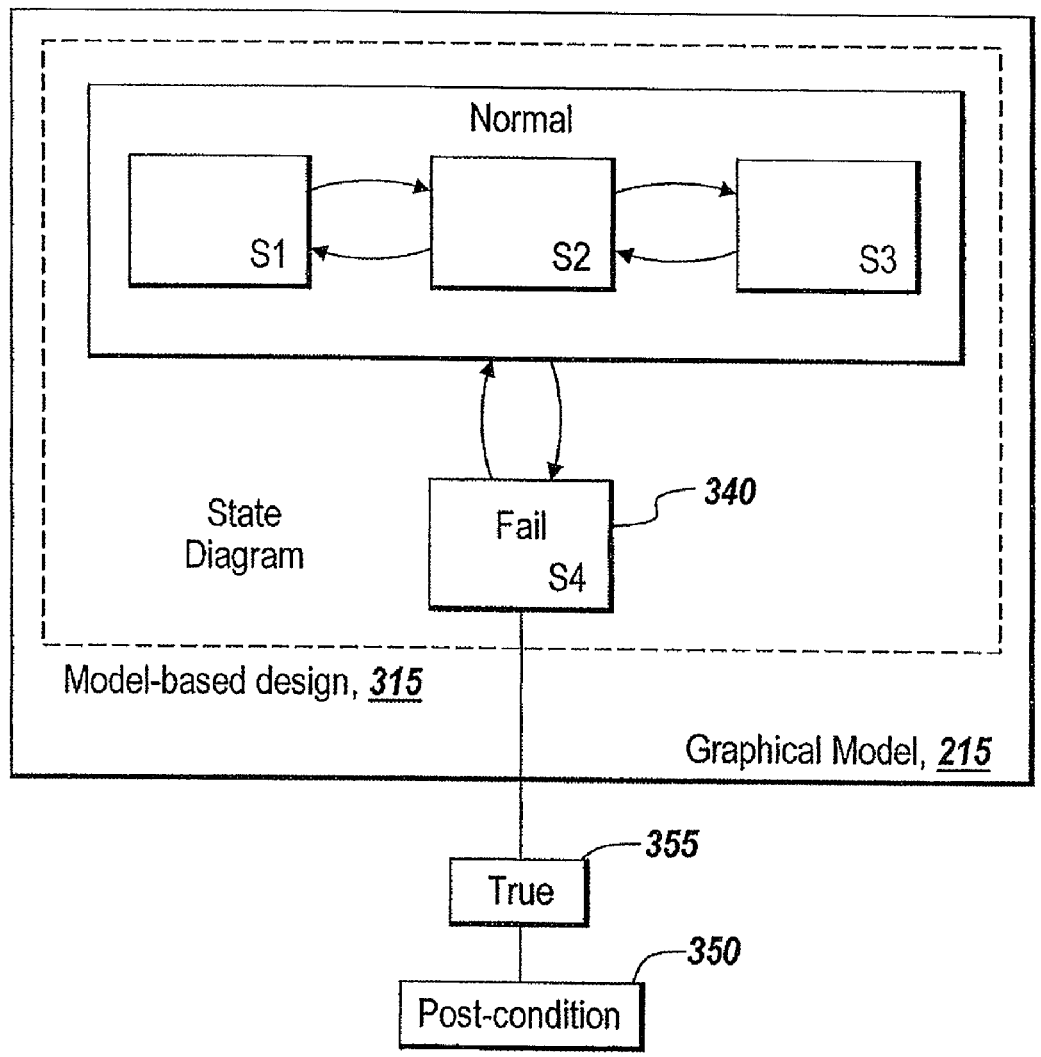
FIG. 3E is a diagrammatic view of an illustrative postcondition element and a graphical model representing a state machine for practicing a further embodiment of the present invention.

FIG. 3E depicts another illustrative postcondition element 350 with another illustrative model-based design 315 of a graphical model 215. The model-based design 315 of FIG. 3E depicts a graphical model 215 in the form of a state diagram model, such as a state diagram model provided by Stateflow® with Simulink®, including multiple state blocks connected together via transitions as known by those ordinarily skilled in the art. A postcondition element 350 and desired result 355 may be associated with a state of the state diagram model 315. In the illustrated example, the postcondition 350 is associated with the fail state 340. The desired result 355 may be expressed as any type of conditional, such as a "TRUE" expression, and may use or reference any data element of the fail state 340 that represents or provides a value or state of the fail state 340. In this manner, the postcondition element 350 may indicate to a verification tool 220 to test for scenarios where the state diagram model 315 transitions to the fail state 340. For example, the designer of the state diagram model 315 may want to explore and test design scenarios including states, conditions, events, and actions that cause the design 315 to fail.

Figure 3F:
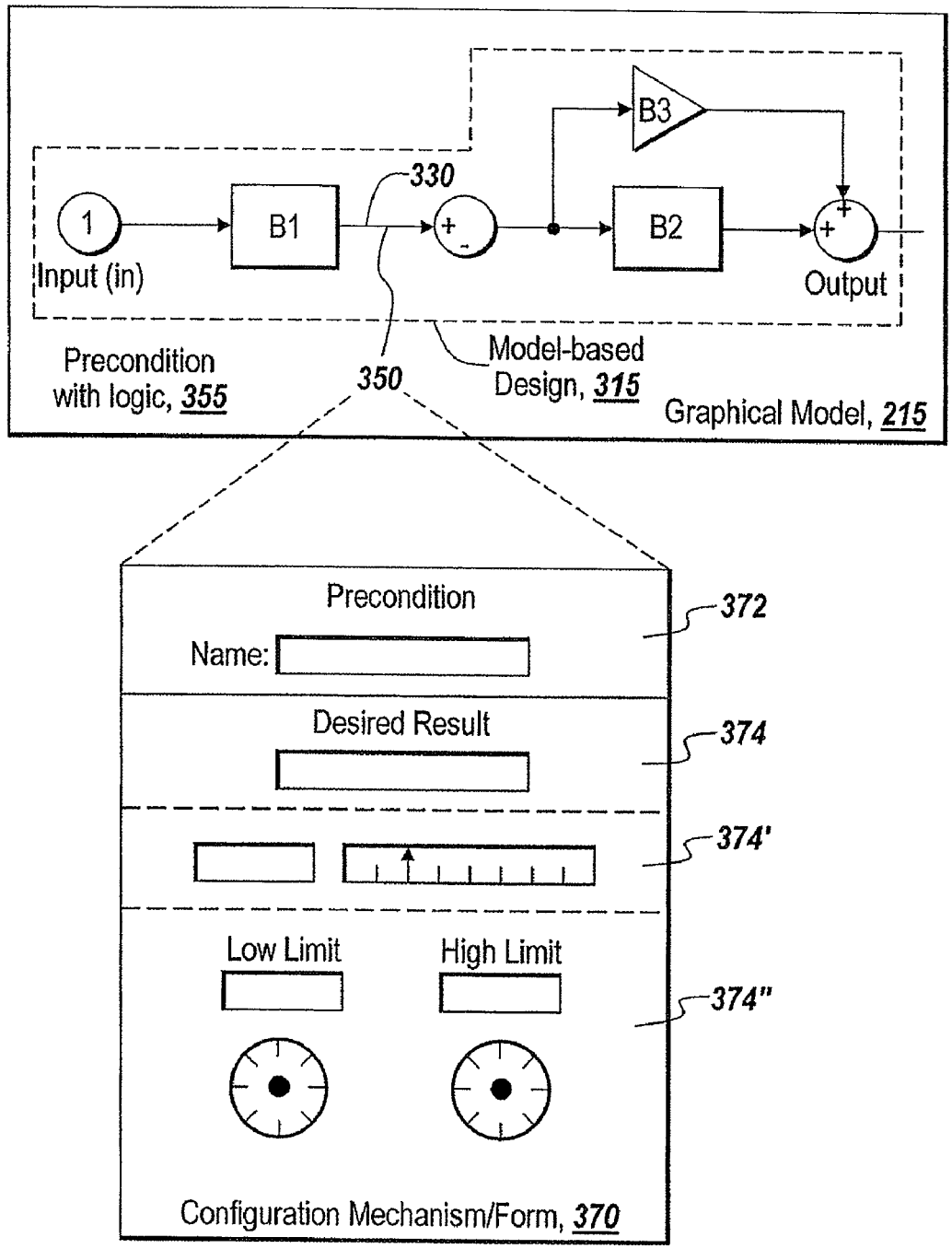
FIG. 3F is a diagrammatic view of an illustrative configuration mechanism for a postcondition element for practicing another embodiment of the present invention.

FIG. 3F illustrates another embodiment of the postcondition element 350 of the present invention. In this embodiment, the postcondition element 350 is incorporated as a configuration of an element or a portion of the design 315 of the graphical model 215. By way of example, FIG. 3F depicts a postcondition element 350 associated with a signal 330 of a block diagram model 215. As illustrated, the postcondition element 350 may not be a separate element or construct of the model 215 but instead may be data or information configured or associated with a model element. A configuration mechanism such as a graphical user interface 370 may be used to identify the postcondition 350 and specify the desired result 355. In other embodiments, a command line interface or application programming interface (API) may be used to provide a postcondition element 350 and/or constraint 355.

By way of example, the configuration mechanism 370 of a user interface illustrated in FIG. 3F may provide any suitable means and/or mechanisms for identifying a postcondition 350 and/or specifying a constraint 355. For example, the user interface 370 may provide a text field 372, or any other suitable user interface element, for specifying a name or identifier of the postcondition 350. For specifying the desired result 355, the user interface 370 may provide an input element 374, such as a text field or edit box, to allow a user to enter in free form any expression for the desired result 355. In one embodiment, the user interface 370 may provide a slider element 374' for selecting a desired value for the signal 330. The slider element 374' may allow a single value to be selected or a range of values to be selected. In another embodiment, the user interface 370 may provide user interface elements 374" to present a dial mechanism to select one or more values for a desired result of the signal 330. For example, a first dial may be used to select or provide a low limit and a second dial may be used to select or provide a high limit for a range of values for the desired result 355. Although the configuration mechanism 370 is illustrated with a certain set of user interface element 372, 374, 374' and 374", one ordinarily skilled in the art will recognize and appreciate that any type and/or form of user interface elements, graphical or textual, may be used to configure a postcondition 350 and constraint 355.

Figure 3G:
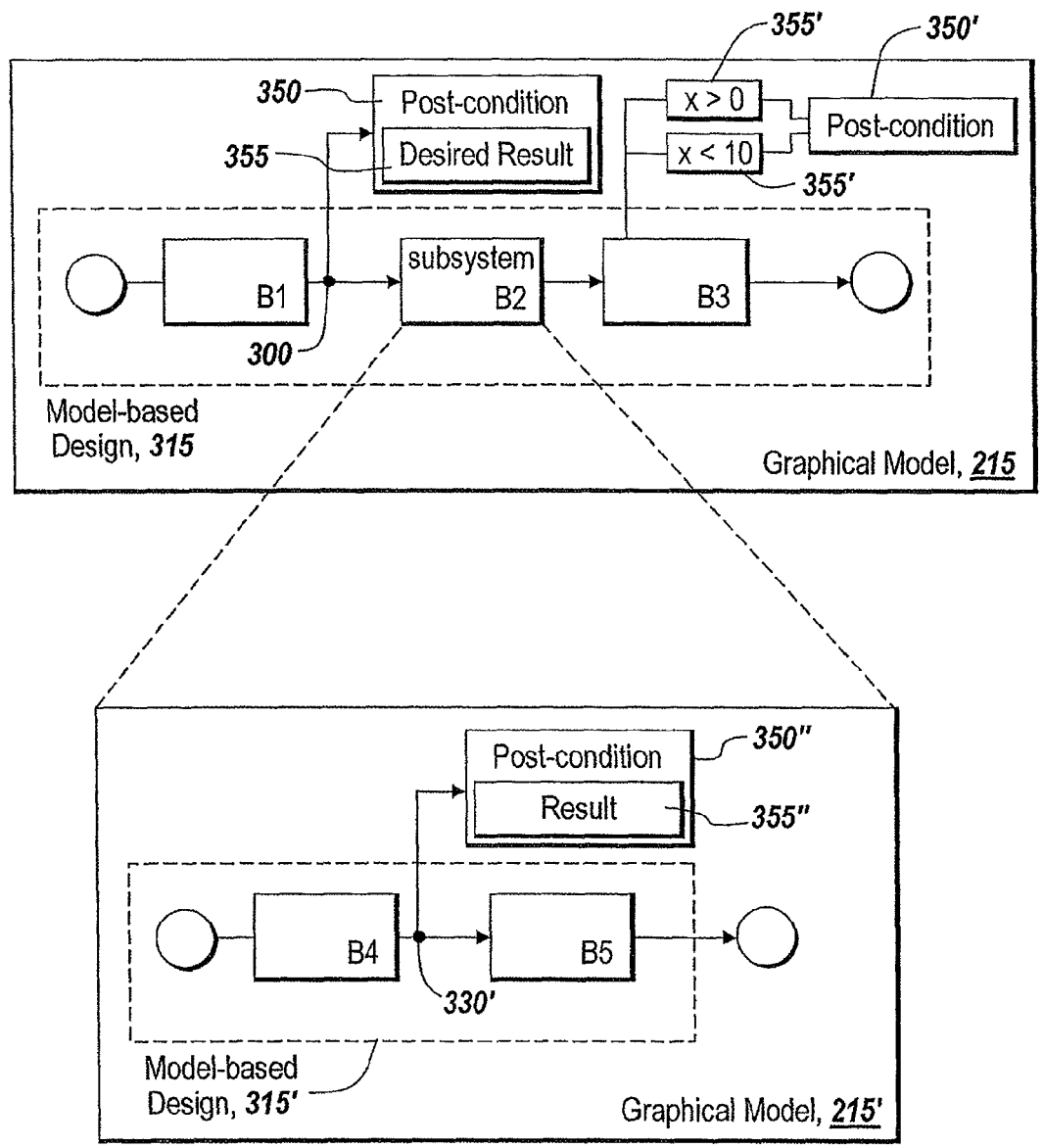
FIG. 3G is a diagrammatic view of an illustrative hierarchical graphical model with multiple postcondition elements for practicing another embodiment of the present invention.

Referring now to FIG. 3G, a hierarchical graphical model 215 with multiple postcondition elements 350 is depicted in another illustrative embodiment of the present invention. Using the techniques of the present invention, a postcondition element 350 may be associated with different elements or portions of the design 315 and at different hierarchical levels of the design 315. The illustrative graphical model 215 of FIG. 3G is a multiple-block block diagram model with one of the blocks B2 providing or referencing a sub-system or another graphical model 215'. At the first level of the graphical model 215, a first postcondition element 350 is provided for the output signal 300 and a second postcondition element 350 is provided for the block B3 of the design 315. As illustrated in FIG. 3G, the first postcondition element 350 may be a single construct while the second postcondition element 350' is a multiple element construct. The second postcondition element 350' may include multiple constraints 355' logically combined to provide a constraint for the postcondition element 350'. For example, the desired value range for a data element of block B3 may be specified as a value greater than 0 logically AND'd with a value less than 10. At the second hierarchical level of the graphical model 215, the graphical model 215' provides a sub-system of the design 315 via block B2, and a third postcondition element 350" is provided for the output signal 330' of the design 315'.

Although not illustrated in FIG. 3G, the embodiment of the postcondition element 350 of FIG. 3F may also be deployed in the multiple postcondition element and hierarchical graphical model embodiment of FIG. 3G. Additionally, any one or more of the postcondition elements 350, 350', and 350" may be configured to be active or inactive. This provides the designer the configurability to provide and use different postcondition elements 350, 350' and 350' in combination or alone. For example, the designer may not be concerned with the verification of the sub-system or second hierarchy of graphical model 215 and therefore set the third postcondition element 350" to an inactive or off state. In this manner, a verification tool 220 may not consider the third postcondition element 350" when performing verification.

Although in FIGS. 3A-3G, the postcondition element 350 is illustrated as part of and included in the graphical model 215, the postcondition element 350 may be provided external to but in association with the graphical model 215 or the design 315 of the graphical model 215. In some embodiments, the postcondition element 350 maybe identified and/or the desired result 355 specified in an external storage location, such as a file, a library, another software program or set of executable instructions, or any other computer readable medium or storage location. In other embodiments, the postcondition element 350 may be defined in an input file for a code generation process so that the postcondition element 350 may be provided in association with the executable form 225 of the design. One ordinarily skilled in the art will recognize and appreciate that the postcondition element 350 of the present invention may be specified externally to the graphical model 215 by other suitable means and/or mechanisms and in other environments in practicing the operations of the present invention described herein.

Figure 4:
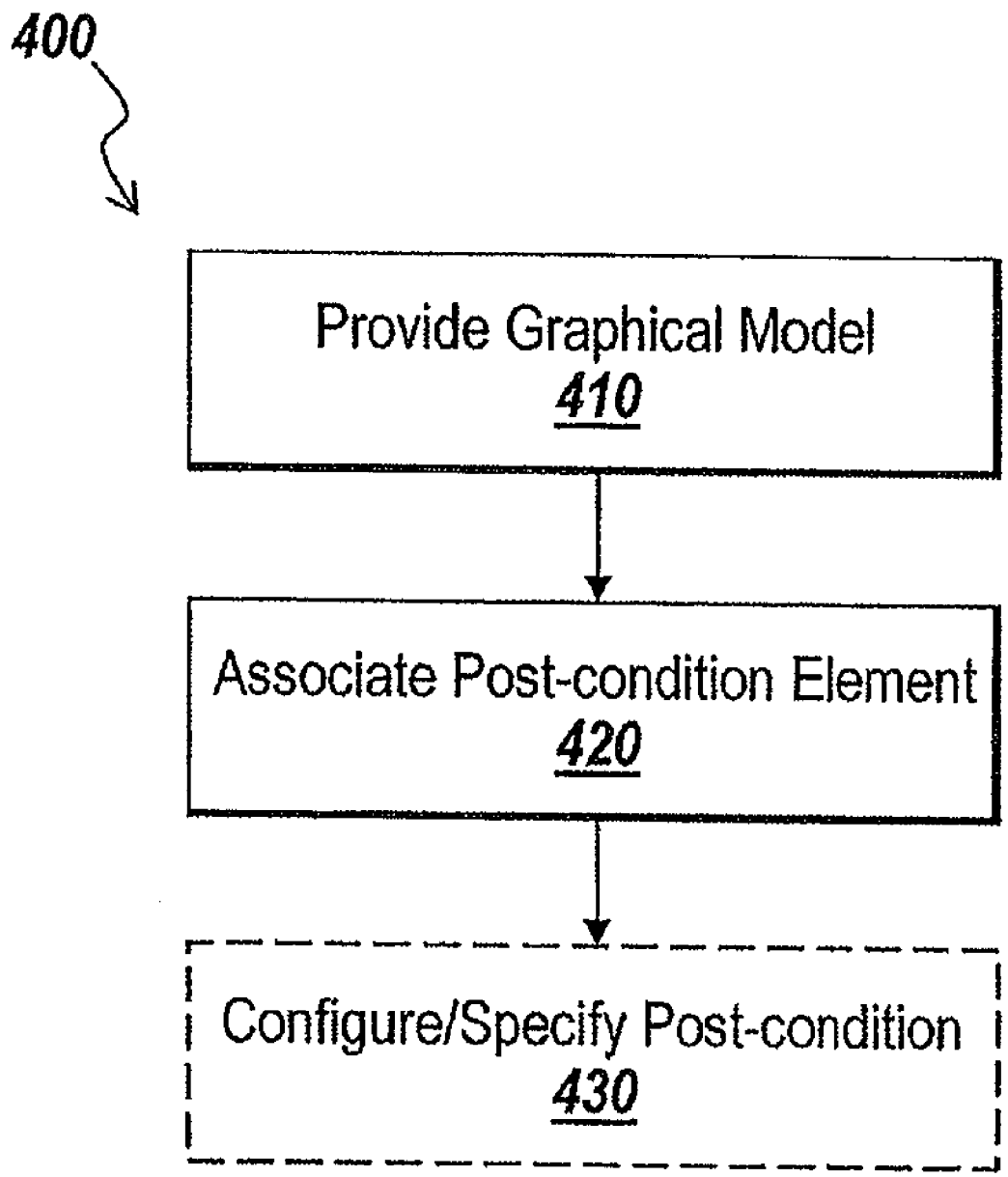
FIG. 4 is a flow diagram depicting an illustrative method for practicing an embodiment of the present invention.

In another aspect, the present invention is directed towards a method of using a postcondition element 350 for providing verification criteria in the graphical model. FIG. 4 depicts an illustrative method 400 of practicing the technique of using a postcondition element 350 in an illustrative embodiment of the present invention. At step 410 of illustrative method 400, a graphical model 215 is provided, such as any of the graphical models 215 of FIG. 3A-3G. In the exemplary embodiment, the graphical model 215 may be created, designed, edited, or otherwise provided by a graphical modeling tool 210 such as in a modeling environment of Simulink® and Stateflow®.

At step 410 of illustrative method 400, a portion of the design 315 of the graphical model 215 is identified for associating a postcondition. For example, a designer or modeler of the design 315 may determine which elements and functionality of the system under test to provide a postcondition. A postcondition may be associated with the design 315 for a variety of reasons and purposes as one ordinarily skilled in the art would appreciate. Additionally, the portion of the graphical model 215 associated with a postcondition may be based on the context and environment of the system, the desired behavior, the intended use or goal of the system, and the desire of the designer. In some embodiments, the postcondition element may be used to 1) constrain the behavior of a design under test or verification to those patterns that may be more meaningful in the larger context of the design being analyzed, 2) force execution patterns to be more realistic in the context of the system and the system's environment, 3) improve the performance of automated verification techniques by reducing the execution space that must be explored or executed, and/or 4) perform guided design exploration through the use of formal analysis or test generation. One ordinarily skilled in the art will further appreciate and recognize that the postcondition element 350 may be used to provide any type and/or form of condition, instruction, command, or directive to a testing or verification tool, or to another system or environment, to use or execute the design 315 in executable form 225 in a desired manner.

At step 420 of illustrative method 400, a postcondition element 350 is provided and associated with a portion of the design 315 represented by the graphical model 215. The graphical modeling tool 210 provides any type and/or form of suitable means and/or mechanism for creating, identifying, designing, configuring, specifying, or otherwise providing a postcondition element 350. In some embodiments, the graphical modeling tool 210 provides a toolbox or palette for dragging and dropping or otherwise placing a postcondition element 350 in the design layout area for the graphical model 215. A postcondition element 350 may be associated with a portion of the design by either a physical connection in the design 350 or by a logical or virtual association. In some embodiments, the postcondition element 350 is connected via a line or other suitable connector or graphical element to the identified portion of the design 315. For example, a postcondition element 350 may be connected to a signal line, a block, or a state of a block diagram model 215. In other embodiments, the association between the postcondition element 350 and the portion of the design 315 may be formed via a reference or identifier in the configuration of the postcondition element 350 to the desired portion of the design 315. One ordinarily skilled in the art will recognize and appreciate the various means and/or mechanisms to associate a postcondition element 350 with a portion of the design 315.

As part of step 420 a portion of the design 315 of the graphical model 215 is identified for associating a postcondition. For example, a designer or modeler of the design 315 may determine which elements and functionality of the system under test to provide a postcondition for. A postcondition may be associated with the design 315 for a variety of reasons and purposes as one ordinarily skilled in the art would appreciate. Additionally, the portion of the graphical model 215 associated with a postcondition may be based on the context and environment of the system, the desired behavior, the intended use or goal of the system, and the desire of the designer. One ordinarily skilled in the art will further appreciate and recognize that the postcondition element 350 may be used to provide any type and/or form of condition, instruction, command, or directive to a testing or verification tool, or to another system or environment, to use or execute the design 315 in executable form 225 in a desired manner.

Additionally, illustrative steps 410 and 420 may be repeated as desired to associate one or more postcondition elements 350 with different portions of the design 315 of the graphical model 215. Furthermore, steps 410 and 420 may be performed at one or more levels of hierarchy that may be provided by the graphical model 215.

The postcondition element 350 may be configured to identify the desired postcondition as depicted at step 430 of illustrative method 400. In such embodiments, the graphical modeling tool 210 may provide any type and/or form of suitable configuration mechanism, such as the user interface 350 illustrated in FIG. 3F, to configure the postcondition element 350. In other embodiments, a pre-configured or fixed-functionality postcondition element 350 may be used. In further embodiments, a template or pre-configured postcondition element 350 may be provided and further configured or modified as desired using any suitable configuration mechanism. In configuring the postcondition element 350 at illustrative step 430, the desired result 350 may be defined or specified to provide the desired result using any graphical or textual form, syntax, or language as previously discussed in connection with FIG. 3A. Additionally, in practicing the operations of the present invention and illustrative method 400 as described herein, any one or more postcondition elements 350 may be configured to be active or inactive as maybe desired during the design, test, and verification process.

In another aspect, the present invention is directed toward generating code from the graphical model 215 incorporating the postcondition element 350 of the present invention to provide an executable 225 and postcondition specification for the verification tool 220 or any other system. An illustrative method 500 of FIG. 5A and system 502 of FIG. 5B of the present invention will be used to discuss the operations, functions, and structure of the code generation techniques of the present invention. Referring to FIG. 5B, in brief overview, the code generating system 502 comprises a code building tool 590 having a code generator 520. In an exemplary embodiment of a graphical modeling and verification environment 120 of MATLAB® and Simulink®, the code building tool 590 may comprise the Stateflow® Coder and Real-Time Workshop® products both manufactured by The MathWorks, Inc.

Figure 5A:
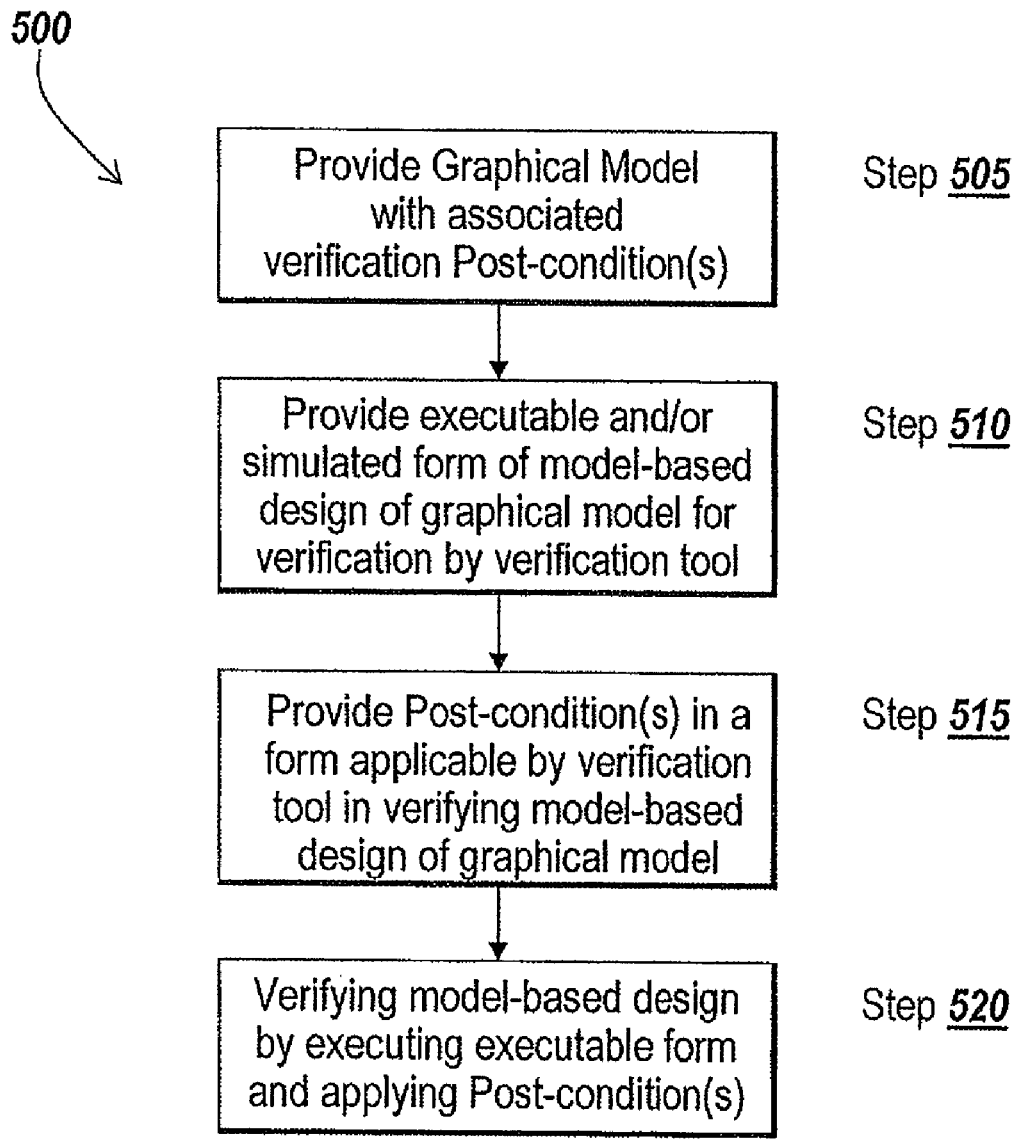
FIG. 5A is a flow diagram depicting an illustrative method for practicing an embodiment of the present invention to generate an executable for verification from an illustrative graphical model.
Figure 5B:
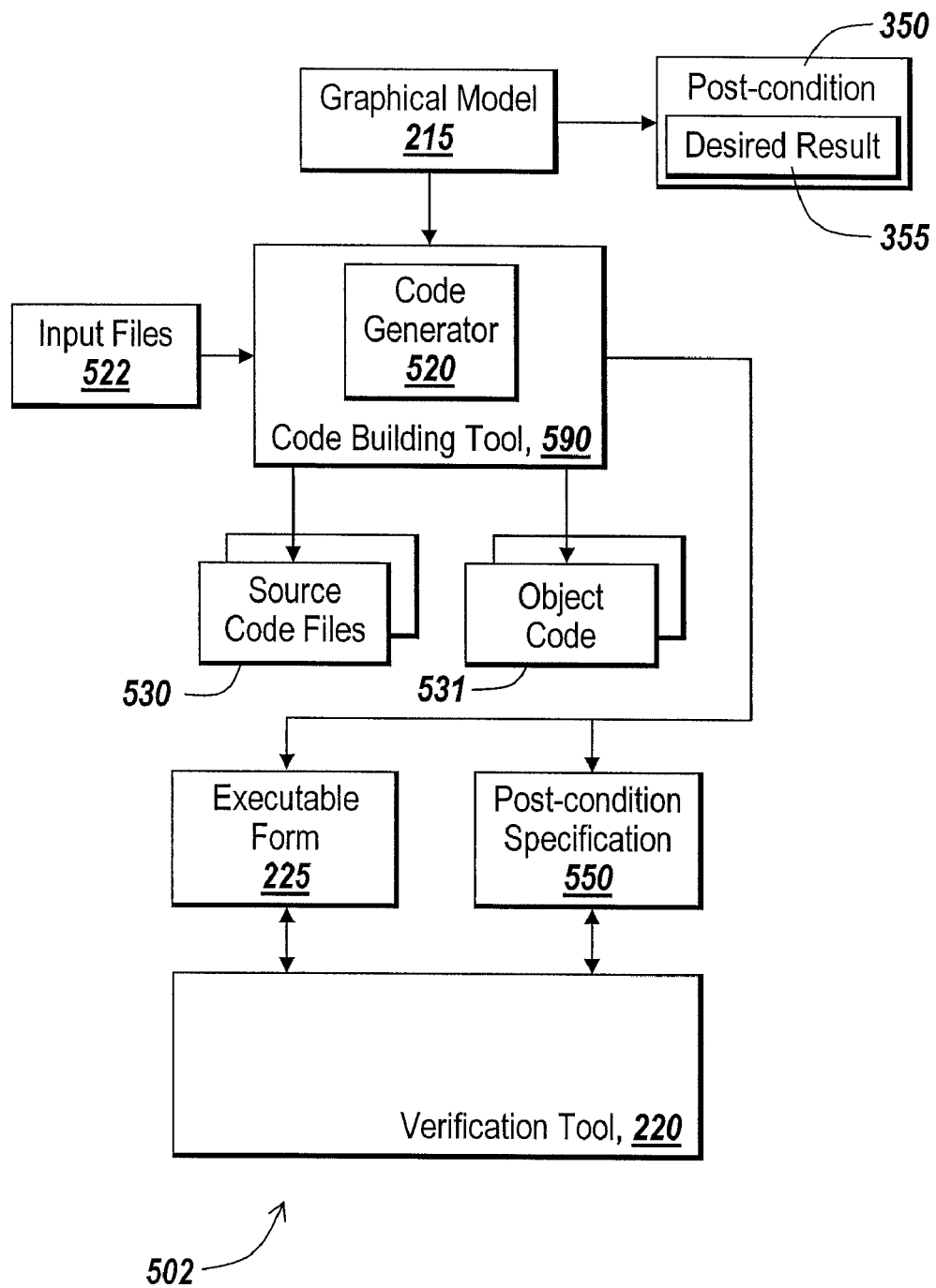
FIG. 5B is a block diagram of an illustrative executable generation system for practicing an embodiment of the present invention.

Referring to FIG. 5A, the illustrative method 500 of the present invention obtains a graphical model 215. The graphical model 215 may include one or more postcondition elements 350. In some embodiments, the graphical model 215 may be obtained via a file. The graphical model 215 may comprise a file in a format that the code building tool 590 or code generator 520 can read and that follows a file specification for defining postcondition elements 350 or for otherwise referencing a postcondition element 350. In some embodiments, the postcondition element 350 is included with or is a part of the graphical model 215. In other embodiments, the postcondition element 350 may be referenced by or associated with the graphical model 215 but provided by a file or medium external or separate from the graphical model 215. In these cases, in providing the graphical model 215 at illustrative step 505, any other files or resources needed to perform the code generation process as described herein may also be provided.

In some embodiments, the code building tool 590 and/or code generator 520 may obtain either the graphical model 215 from an application programming interface (API) call to another application or via an interface to another environment, such as the graphical modeling tool 210. In yet a further embodiment, the graphical modeling tool 210 or another computer program saves and converts the graphical model 215 into a format readable by the code building tool 590. For example, a graphical model 215 produced with Simulink® and Stateflow® may be converted into an intermediate model file representation such as an .rtw type file readable by the automatic code generator of Real-Time Workshop®.

At step 510 of illustrative method 500, an executable or simulateable form 225 of the model-based design 315 of the graphical model 215 is provided or generated and built for verification by a verification tool 220. The code building tool 190, such as Stateflow® Coder and/or Real-Time Workshop®, may generate code for the graphical model 215. The code building tool 590 and code generator 520 use one or more input files 522 in conjunction with reading and processing the graphical model 215.

The one or more input files 522 may comprise files including templates, commands, input parameters, configuration data, source code, data and class definitions, component configuration, device driver or any other information that may be used by the code generator 520 to generate code for the graphical model 215. The input files 522 may include files to provide input to and configure the code generator 520 to generate source code files 530 for a specific target hardware platform, for example, a specific processor. In an exemplary embodiment of Real-Time Workshop® as the code generator 520, Real-Time Workshop® uses target language compiler script files, with a .tlc file extension, as input files 522 to the code generation process. The .tlc files provide sections of programming instructions to be implemented for block and element references as they may be found in the graphical model 215 during the code generation process. The .tlc files also can provide data and class definitions for data element references found in the graphical model 215. Furthermore, the .tlc files may provide data and other information to translate postcondition elements 350 associated with the graphical model 215 into postcondition specifications 550 to be used by the verification tool 220 or the target system. Additionally, the .tlc files also comprise compiler directives, built-in functions, and other code generation commands to direct Real-Time Workshop® during the code generation process.

In operation, the code generator 520 reads in information regarding or a representation of the graphical model 215 and uses the input files 522 to generate code by translating the graphical model 215 into one or more source code files 530. By way of example, the automatic code generation can be discussed in terms of generating code with Real-Time Workshop® from a block model diagram 215 generated with Simulink®. Simulink® creates and stores block diagram models 215 into model files with an .mdl file extension. As part of the code generation process, Real-Time Workshop® reads in an .mdl model file and analyzes the model to generate an intermediate model file with an .rtw extension. This intermediate .rtw model file comprises a hierarchical structure of records describing systems and their blocks and connections analyzed from a block diagram model 215 of the .mdl file.

A language compiler called the target language compiler of Real-Time Workshop® works with .tlc files and .rtw file to produce code. The target language compiler interprets a program that reads the intermediate model file description of an .rtw file. As the target language compiler encounter a record in the .rtw file, it uses directives in the .tlc files corresponding to the record to direct the code generation process for the specific record. As such, the target language compiler works much like a text processor. For example, the target language compiler uses block .tlc files, which specify the particular code for a block, to transform each block into code. When it reads a record in the .rtw file that references a block, the target language compiler applies code from the corresponding block .tlc file to generate code for the block in source code files 522. Additionally, model wide .tlc files are also used to provide input to the target language compiler for global customization of the code. Model wide .tlc files may direct the target language compiler to generate main routines to provide entry points into the program, source code header files to setup data structures, and utility functions to support code for particular blocks. The block and model wide .tlc files can be modified to generate customized code for blocks and to generate any desired global customizations to the code.

The source code files 530 generated from the code generator 520, such as Real-Time Workshop®, may comprise program instructions of a programming language, such as C, which may further be in a format and style following the ANSI/ISO C standard. Additionally, the source code files 530 may be generated to comprise fixed-point or floating-point source code. The programming instructions of the source code files 530 may be generated to run on any real-time operating system or for a specific processor. In a further embodiment, the programming instructions of the source code files 530 may be optimized for performance or versatility, and/or for a specific target hardware platform. In another embodiment, the code generator 520 can be configured via the input files 522 to generate custom source code comprising a style and format as directed by the input files 522. The code generator 520 can be also configured via the input files 522 to provide customized source code to support such customizations as error handling, optimization, code and data reduction, code reusability, scoping of variables, and other characteristics of the source code that may be modified during the source code generation process.

In some embodiments, a portion of the source code 530 or object code 531 generated or provided by illustrative method 500 may be targeted to run on a specific computational hardware device, such as an embedded hardware platform, or a specific processor of a computing device 102 and another portion may be targeted to run on a personal computer, such as a desktop or notebook. For example, a portion of the design 315 of the graphical model 315 may process data or perform loops that are time critical. In comparison, the display may not need to be updated in a time critical manner as the viewer's eyes may only perceive updates at a certain rate. The time critical data processing or loops may be embodied in source code 530 and/or object code 531 targeted for a specific processor of a certain speed or capability and the non-time critical code 530, 531 may be targeted for any general computing device. One ordinarily skilled in the art will recognize and appreciate the various ways to process and target various portions of code to meet the desired functionality and/or execution of the design 315 represented by the graphical model 215.

At step 510 of illustrative method 500, one or more programs may be built from the automatically generated code to provide an executable form 225 to execute the design 315 represented by the graphical model 215. The code building tool 590 also provides for the building of the source code files 530 into object code 531 to generate one or more programs to run on a target platform and/or operating system or to be executed or used by a target verification tool 220. As depicted in FIG. 5B, the executable 225 provides an executable form of the design 315 represented by the graphical model 215.

The build process of illustrative step 510 of the present invention may include compiling the code and linking libraries, drivers, and other programs via a make program or some other compiling utility. In one embodiment, the code building tool 590 invokes a compiler provided by software available with the operating system, such as a make utility on a UNIX operating system. In another embodiment, the compiler may be provided from a software development package such as Visual C/C++ from Microsoft Corporation of Redmond, Wash. One ordinarily skilled in the art will recognize the code building tool 590 may invoke any type of compiler that is configured to and capable of translating the source code 530 into object code 531 to be executed by the target computing device 102.

Although the code generator 520 is generally discussed in terms of generating source code, the code generator 520 may provide code in any other form, such as object code, pre-existing source code, or other programmable instructions suitable for representing the functionality of the design 315 represented by the graphical model 215. Additionally, although the illustrative embodiment of the present invention is discussed in terms of source code files 530 and object code 531 from a programming language like C, the code generator 520 may generate any type of programming related output, such as an interpreted programming language and/or scripting language. For example, the code generator 520 may generate code for perl, awk, VBscript, Javascript, tcl, Python, or the technical computing programming language of MATLAB®. In other cases, the code generator 520 may generate output in other types of languages, such as the hardware description language of HDL or a custom or specific language of a verification tool 220. One ordinarily skilled in the art will recognize the various types of languages the code building tool may apply in generating code and how the code generator may build the code based on the type of language.

In other embodiments of step 510 of illustrative method 500, the executable form 225 of the model-based design 315 may not need to be generated, such as from an automatic code generation system. The graphical model 215 may already be in a form that is executable by either the graphical modeling tool 210 or the verification tool 220. In this manner, the graphical model 215 may provide the executable form 225 for testing or verification by the verification tool 220. Although generally discussed as an executable form 225 of the model-based design 315, the executable form 225 may also be referred to as a simulation form or as being simulateable in that the graphical model 215 can be executed, simulated, tested, or verified.

At step 515 of the illustrative method 500, the postcondition element 350 associated with the graphical model 215 is provided in a form applicable by the verification tool 220 or target system in testing or verifying the executable form 225 of the design 315. For example, the code generation process may provide a postcondition specification 550 for a verification tool by processing or translating the postcondition element 350 into a desired or suitable form. In some embodiments, the postcondition element 350 is considered separate from the design 315 and is therefore not included or incorporated in the executable form 225 of the design 315. For example, the postcondition element 350 may be intended and configured not to affect the behavior of the system design 315. In these cases, code may not be generated for the postcondition element 350.

In some embodiments, the code generation process described above may be used to provide a postcondition specification 550 having a desired form and content for use by the target system, such as the verification tool 220. For example, the postcondition specification 550 may be processed by illustrative step 510 to be provided in the same language as the code of the executable 225. In other embodiments, the postcondition element 350 and/or desires result 355 may be configured or defined to already have a form to be used and processed by a target verification tool 220. As such, the postcondition specification 550 may be formed or provided by extracting, parsing, or otherwise using content from the configuration or definition of the postcondition element 350. In yet a further embodiment, the executable form 225 may be generated at illustrative step 510 to incorporate any type and/or form of mechanisms to provide for or apply the postcondition element 350 and/or postcondition specification 550.

In view of steps 505, 510 and 515, one ordinarily skilled in the art will recognize and appreciate that the illustrative method 500 is directed towards providing an executable form 225 and a postcondition specification 550 of the design 315 such that a verification tool 220 or other target system may execute testing or verification of the design 315 in a desired manner by applying the postconditions according to the postcondition element 350. At step 520 of illustrative method 500, the design 315 represented by the graphical model 315 is verified by the verification tool 220 by executing the executable form 225 and applying the postconditions according to the postcondition specification 550. One ordinarily skilled in the art will recognize and appreciate that the manner and techniques used for performing verification and applying the postconditions will be based on the verification tool 220. Furthermore, the design and verification process may be interactive and illustrative methods 400 and 500 may be performed multiple times with different or modified designs 315 and/or postcondition elements 350 to reach or otherwise provide for the desired result or to otherwise finalize a design 315.

In view of the structure, functions and operations of the systems and methods as described herein, the present invention provides a design technique and mechanism for specifying postconditions for the test, analysis, and/or verification of a model-based design.

The postcondition element of the present invention can be used in a model-based design approach in such a manner as to not affect or alter the behavior of the system but at the same time provide criteria for the verification of the system. The system design represented by the graphical model may be used as a design specification for an implementation, and associated with or in the same graphical model the postcondition element may be used as a design specification for verification. Instead of using the configuration or development environment of the verification tool to specify postconditions, the designer may specify postconditions in the graphical modeling environment in the same modeling language and format as the design specification for implementation. This enables the designer to more easily and efficiently associate results from verification and corresponding postconditions with the design specification provided by the graphical model.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

What is claimed is:

1. A method comprising:
    associating, by a computing device, a non-textual element with a portion of a graphical model, the non-textual element representing a postcondition and indicating a result to be verified;
    processing, by the computing device, the non-textual element and the graphical model into an executable form; and
    providing, by the computing device, the executable form to a verification tool for verification of the result indicated by the non-textual element.

2. The method of claim 1, where the non-textual element comprises a graphical representation of the postcondition.

3. The method of claim 1, where the processing the non-textual element, further comprises:
    configuring the non-textual element to specify a form of the result.

4. The method of claim 1, further comprising:
    associating, by the computing device, a second non-textual element with another portion of the graphical model, the second non-textual element representing another postcondition and indicating another result to be verified; and
    where the processing the non-textual element into the executable form, further comprises:
        processing the second non-textual element into the executable form.

5. The method of claim 1, where the non-textual element is associated with the portion of the graphical model at a first hierarchical level of the graphical model, the method further comprising:
    associating, by the computing device, a second non-textual element with another portion of the graphical model at a second hierarchical level, different than the first hierarchical level, of the graphical model, the second non-textual element representing another postcondition and indicating another result to be verified.

6. The method of claim 1, further comprising:
    verifying, by the verification tool, the result indicated by the non-textual element.

7. The method of claim 1, further comprising:
    simulating, by the verification tool while ignoring the non-textual element, the model-based design; and
    testing, by the verification tool, for the result indicated by the postcondition element.

8. A system comprising:
    a computing device that includes:
        a first component to:
            indicate, in a generated non-textual element, a result for verification,
            associate the generated non-textual element with an element of a graphical model, the generated non-textual element being representative of a postcondition associated with the result,
            process the generated non-textual element and the graphical model into an executable form, the executable form being executable by a second component, and
            provide the executable form to the second component for verification of the result.

9. The system of claim 8, where the generated non-textual element comprises a graphical representation of the postcondition.

10. The system of claim 8, where the first component is further to:
    configure the generated non-textual element to specify a form of the result.

11. The system of claim 8, where the first component is further to:
    associate a second generated non-textual element with the portion of the graphical model, the second non-textual element representing another postcondition and indicating another result to be verified, and process the second non-textual element into the executable form.

12. The system of claim 8, where the non-textual element is associated with the portion of the graphical model at a first hierarchical level of the graphical model, and
where the first component is further to:
associate a different non-textual element with a different portion of the graphical model at a different hierarchical level of the graphical model, the different non-textual element representing a different postcondition and indicating a different result to be verified.

13. The system of claim 8, where the second component is to:
receive the executable form from the first component; and
verify the result indicated by the non-textual element.

14. The system of claim 13, where the second component is further to:
simulate, while ignoring the non-textual element, the model-based design.

15. A system comprising:
a processor to:
generate a graphical model, the graphical model including:
a model-based design, the model-based design representing a designed system, and
a non-textual element, the non-textual element associating a postcondition with the model-based design without affecting a behavior of the model-based design and indicative of a result, the result relating to the postcondition and the designed system; and
a verification component to:
verify the result indicated by the non-textual element.

16. The system of claim 15, where the non-textual element comprises a graphical representation of the postcondition.

17. The system of claim 15, where the verification component is further to:
simulate, while ignoring the non-textual element, the model-based design.

18. The system of claim 17, where the processor is further to:
translate a functionality of the graphical model into an executable form, the executable form being executable by the verification component.

19. The system of claim 15, where the graphical model further comprises:
a plurality of non-textual elements, the plurality of non-textual elements associating a plurality of postconditions with one or more portions of the model-based design.

20. The system of claim 19, where the plurality of non-textual elements are indicative of a plurality of results and each of the plurality of results being related to a corresponding one of the plurality of postconditions.

* * * * *